United States Patent [19]
Bender et al.

[11] Patent Number: 6,038,604
[45] Date of Patent: Mar. 14, 2000

[54] METHOD AND APPARATUS FOR EFFICIENT COMMUNICATIONS USING ACTIVE MESSAGES

[75] Inventors: Carl A. Bender, Highland; Paul D. DiNicola, Hurley; Kevin J. Gildea, Bloomington; Rama K. Govindaraju; Chulho Kim, both of Poughkeepsie; Jamshed H. Mirza, Woodstock; Gautam H. Shah, Wappingers Falls, all of N.Y.

[73] Assignee: International Business Machines Corporation, Armonk, N.Y.

[21] Appl. No.: 08/918,816

[22] Filed: Aug. 26, 1997

[51] Int. Cl.⁷ .................................................. G06F 13/00
[52] U.S. Cl. ............................................................ 709/233
[58] Field of Search .................................... 709/200, 201, 709/203, 217, 218, 212, 219, 224, 225, 227, 228, 231, 233, 234, 236, 237, 238

[56] References Cited

U.S. PATENT DOCUMENTS

| | | | |
|---|---|---|---|
| 4,399,531 | 8/1983 | Grande et al. | 370/216 |
| 4,623,886 | 11/1986 | Livingston | 340/825.5 |
| 4,993,025 | 2/1991 | Vesel et al. | 370/450 |
| 5,410,536 | 4/1995 | Shah et al. | 370/216 |
| 5,432,798 | 7/1995 | Blair | 714/748 |
| 5,754,789 | 5/1998 | Nowatzyk et al. | 709/233 |
| 5,930,233 | 7/1999 | Kanerva et al. | 370/231 |
| 5,951,706 | 9/1999 | Benner | 370/231 |

*Primary Examiner*—Moustafa M. Meky
*Attorney, Agent, or Firm*—Floyd A. Gonzalez

[57] ABSTRACT

A method, apparatus and program product for message communication in a distributed parallel data processing system. A user message is sent from a sender to a receiver. The user message contains user data and a pointer to a header handler routine. The header handler routine includes a first pointer to a target user buffer and a second pointer to a completion routine. When the user message is received, a low level application program interface (LAPI) is informed which invokes the header handler routines which returns the first and second pointers. LAPI then transfers the user data to the user buffer indicated by the header handler routine, and invokes the completion routine indicated by the header handler routine to complete the transfer of the user message to the receiver.

87 Claims, 3 Drawing Sheets

METHOD AND APPARATUS FOR EFFICIENT COMMUNICATIONS USING ACTIVE MESSAGES

BACKGROUND OF THE INVENTION

The present invention is related to efficient communications using active messages and is more particularly related to sending active messages from a sender to a receiver in a multinode data processing system.

Remote Memory Copy (RMC) (also known as get/put) and Active Messages (AM) have been proposed as alternatives and/or enhancements to standard send/receive messaging protocols typified by the Message Passing Interface (MPI) standard. Active Message is a one-sided communications protocol which allows the origin task to asynchronously invoke a handler in a target task. This is because the Remote Memory Copy interface is generally more flexible in expressing required communication, and Active Messages allow the messaging Application Programming Interface (API) to be easily extended and customized by users to better fit their specific needs. Further, the user can choose to have communications operate in either polling mode or interrupt mode based on the requirements of the user's application.

But for practical use of these Application Program Interfaces (APIs), they must be defined so that they allow for efficient, performance-optimized implementations. A typical Active Message call specifies the data to be moved to the target process, and the address of a handler to be invoked at the target process to manipulate the arriving data in the desired manner. The handler routine is user written and this provides the mechanism for customizing the API to the application's requirements. The handler is responsible for extracting the data from the network, manipulating it as required, and storing the result in the process's target buffer.

Such a definition implies that the whole message has already been received and is supplied to the handler in its entirety when the handler is called. Since a large message is typically sent as a number of smaller network packets which can arrive out of order, these packets must be first assembled (copied) in some buffer by the communications subsystem (CSS), before the handler can be invoked. This implies an additional copy that can be avoided in some instances if the user can directly supply the target buffer where the incoming data should go. Also, to enhance the concurrency of multiple incoming messages, the CSS would have to do complex buffer management. Such buffer management by the CSS, in the absence of any application-specific knowledge, cannot be implemented in the most efficient manner.

Generally, reliable communication is a requirement; that is, applications must be guaranteed that the messages will be delivered, and/or guaranteed that the application will be notified whenever a message is not delivered. This typically requires that each packet or message be "acknowledged." The target process must send back an "acknowledgment message" to the originating process after the message is successfully received at the target. Similarly, for properly flow-controlled communications, message tokens have to be returned periodically via messages. When working in interrupt mode (where arriving messages cause an interrupt at the target), the overhead of processing these secondary "internal" messages is especially undesirable because typically the interrupt handling overhead is very high.

Key performance metrics for messaging libraries are the communication latency and bandwidth. Reliable and flow-controlled message processing requires various different book-keeping functions to be performed as well as introduces various additional "internal" messages in addition to the data transfer itself. If implemented naively, this can significantly add to latency and degrade bandwidth. The key to improving these metrics is to do as much of the book-keeping functions and processing of the "internal" messages off the critical data-transfer path.

Finally, management of internal storage used for keeping control information is an issue. This storage is always at a premium and proper trade-off is required in order to balance the performance and efficiency with the amount of storage to be set aside for this information.

SUMMARY OF THE INVENTION

The invention provides an efficient mechanism for communication between tasks that constitute a parallel job thus allowing problems to be solved more quickly.

The present invention is a low level application programming interface (LAPI) that allows users to efficiently communicate between different tasks of a parallel job. LAPI is a reliable interface in that the user of LAPI does not have to deal with network failures and retransmissions—LAPI will attempt to recover from these errors. In order to provide efficient communication mechanisms to the user, LAPI provides an "Active Message" interface to the user. Additionally, other functions within LAPI (such as the remote memory copy functions GET and PUT) which are provided to enhance the usability of the API are built on top of the active message infrastructure.

Efficient user level communication is enabled in LAPI by the following features: 1) by choosing the active message concept as the basis of the infrastructure, LAPI has the ability to avoid extra copies that are present in traditional communication protocol stacks; 2) an active message gives the user the ability to invoke a handler in the address space of the receiver on receipt of the message; 3) the receipt of a message could be via polling or interrupt mechanisms; and 4) the ability to invoke a handler lets the receiver directly pull the message out of the network buffer into the target buffer, avoiding expensive copy overhead. In LAPI, architectural enhancements to the active message concept are provided in order to effectively utilize it. A user message may be made up of multiple network packets. To avoid burdening the user with packetization and reassembly overheads, LAPI does not expose the notion of network packets to the user. The LAPI architectural approach lets the user specify a header handler on the arrival of a message. The header handler provides a target buffer for the arriving message. In addition, the header handler provides a completion handler which will be invoked on receipt of the entire message. In this way, the user has the ability to supply the target buffer in which the incoming message data is to be reassembled. Users who are writing the handler routines, also do the buffer management in the most suitable manner based on their specific requirements and their knowledge of the specific application.

The decoupling of the handler into a header handler/completion handler pair provides the following advantages:

1) It increases the usability of the interface by shielding the user from the notion of network packets.
2) It allows multiple independent streams of message to be sent and received simultaneously.
3) It increases the possibility of computation overlap with communication.
4) It enables the clearly defined behavior of handlers in a multithreaded environment. At any given instance only one header handler is allowed to execute (since it directly interacts with the network interface). Multiple completion handlers are allowed to execute concurrently (the user is responsible for any synchronization among the completion handlers).

It is thus a primary object of the present invention to provide optimizations to reduce the communication overheads. LAPI can operate in either interrupt mode or polling mode. There are tradeoffs in choosing a particular mode of operation and the user has the ability to dynamically choose the mode. By default LAPI operates in the interrupt mode (again for usability reasons from the point of view of a user who just wants to use the remote memory copy interfaces within LAPI). However, there is a significant overhead to process interrupts. In order to provide reliable message delivery within LAPI there are many internal messages (as is typical in many communication protocol stacks that provide equivalent guarantees of message delivery). Instead of taking an interrupt on every internal message we have devised a mechanism to delay such interrupts. The internal messages include flow control tokens and message completion tokens (different forms of acknowledgements). When LAPI is expecting message completion tokens it raises the interrupt threshold since it is aware that the processing of these tokens can be delayed. Thus some internal messages (namely message completion tokens) will be processed during interrupts caused by other messages (possibly sent by a user) thereby reducing the interrupt processing overhead without substantially impacting the response time for the user (which was one of the reasons to operate in interrupt mode).

Another object of the present invention is the delaying processing of internal messages outside the critical path (that most affects the performance of the communication subsystem observed by the user). To allow a user to access to the address space of another process, LAPI provides the LAPI_Get interface. The arrival of the data requested by LAPI_Get is typically recognized by waiting on a counter (specified during the LAPI_Get operation). If an arriving message causes the counter on which the user is performing a wait to be updated, LAPI avoids processing some internal messages (which is granting message completion tokens back to the sender). This optimization allows the user to not have to wait on the processing of the internal messages. LAPI if possible will process these messages when the user has spare cycles (waiting on some other message).

It is another object of the present invention to provide a fence operation to guarantee ordering of messages. The completion of the fence operation signifies all previous messages have been completed. Since LAPI itself does not guarantee ordered delivery of messages, the fence operation is expected to be used often when messages need to be ordered. LAPI keeps state to differentiate between internally generated messages that do not impact the fence operation and other messages. This enables the fence operation to complete quickly (since LAPI does not have to wait on extra messages).

Another object of the present invention is to provide storage allocation to save information used to update counters after a completion handler finishes execution. LAPI solves the problem for the case where the rate at which completion handlers are started up may be faster than the rate at which they complete. In this situation any buffering that is provided is bound to get filled. LAPI solves this problem by throttling the sender of these messages. This is done by throttling the sender to not send acknowledgments back for the last network packet of a message that requires a completion handler. Thus, the sender cannot complete this message and will resend the unacknowledged packet. When the resent packet arrives, the receiver will check if the required buffer space is now available. If there is available space, the completion handler will be scheduled and the incoming packet acknowledged. If buffering space is still not available, the packet is again ignored (i.e. an acknowledgement is not sent). Thus, the recovery mechanism is used to solve the buffering problem of the completion handler queue.

Another object of the present invention is to solve the problem of extra copy avoidance in Active Messages by restricting the amount of data sent with the message to what can fit in a network packet. This limits the efficiency and achievable bandwidth. Also, since packet lengths may differ, often the amount of data that can be sent in a message is limited to just a few bytes.

Another object of the present invention is to provide an architecture definition of the Active Message call which allows the user to specify the target buffer where incoming data can be reassembled. This avoids copy, improves concurrency of message execution, and increases computation and communication overlap potential, while improving achievable bandwidth.

Another object of the present invention is to provide interrupt avoidance and to do not-critical work off the mainline path, helping improve the achievable latency and bandwidth.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
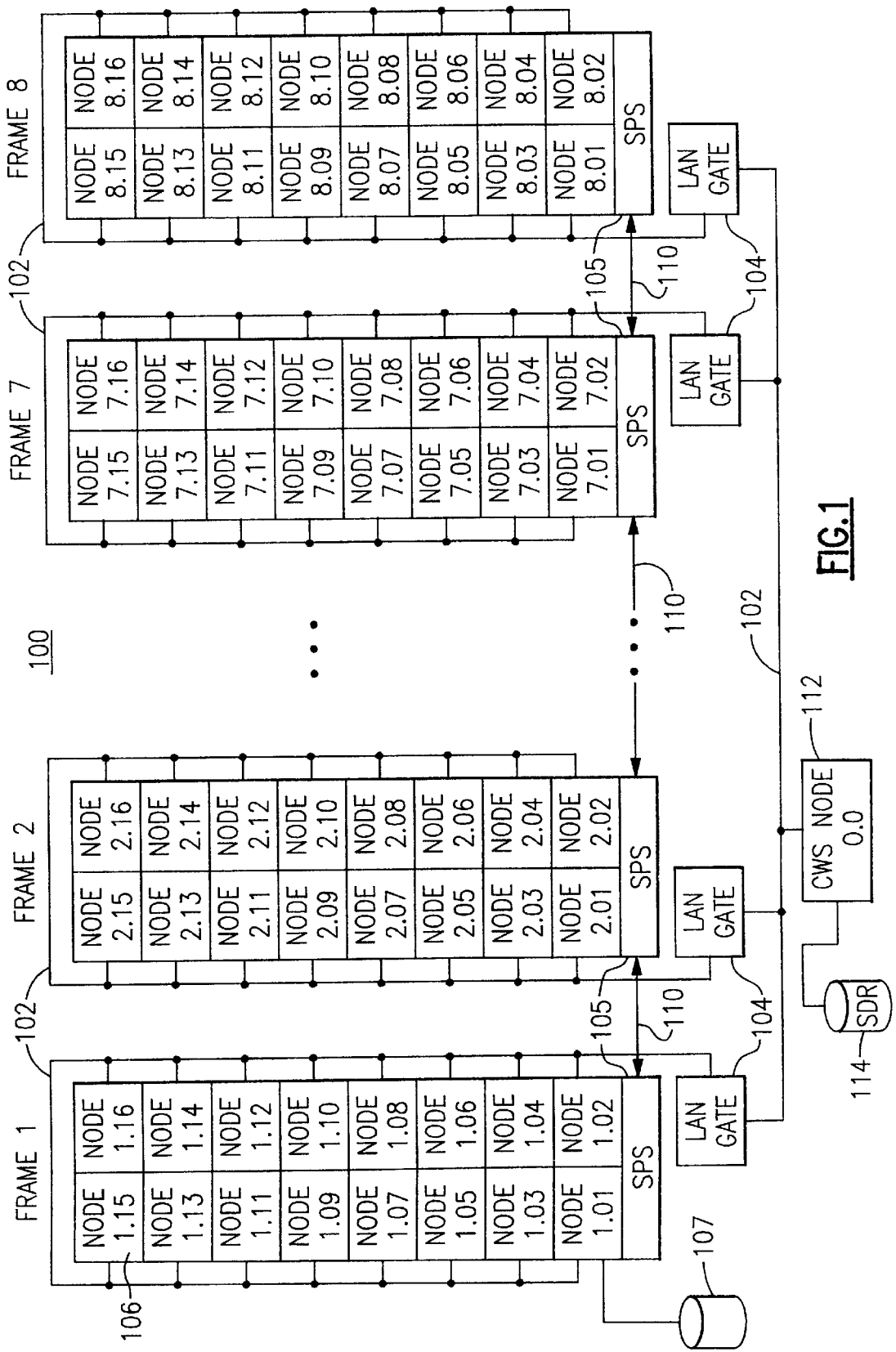
FIG. 1 is a block diagram of a distributed, parallel data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 on which is stored the system data repository files (SDR). The SDR files include such information as a list of nodes that are in the system and their configuration. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105. Adapters (not shown) are placed between each node 106 and the SPS switch 105. One such adapter is shown in U.S. Pat. No. 5,448,558 to Gildea et al. for METHOD AND APPARATUS FOR MANAGING PACKET FIFOS issued Sep. 5, 1995, and owned by the assignee of the present application.

Figure 2:
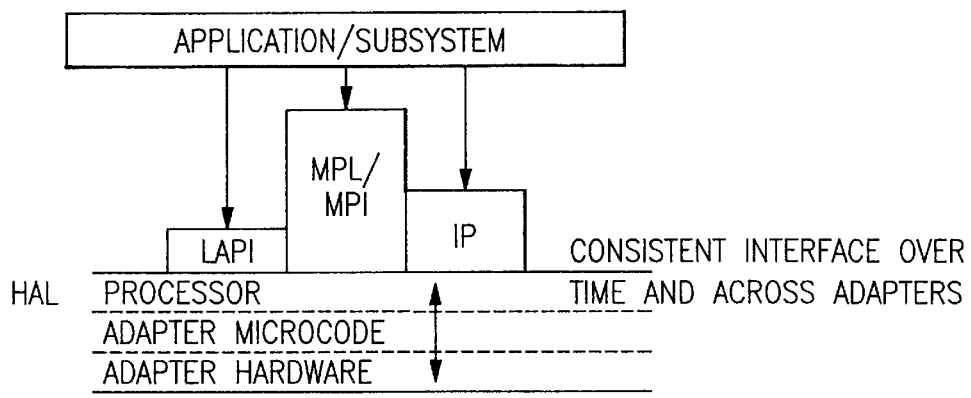
FIG. 2 is a block diagram showing the LAPI layer of the present invention in the operating system of each node of the system of FIG. 1.

The Low-level Applications Programming Interface (LAPI) of the present invention is a new communications API. As shown in FIG. 2, LAPI is a thin layer above the Hardware Abstraction Layer (HAL) interface and provides reliability through flow control (the HAL interface is disclosed in U.S. patent application Ser. No. 08/920,084 for HARDWARE INTERFACE BETWEEN A SWITCH ADAPTER AND A COMMUNICATIONS SUBSYSTEM IN A DATA PROCESSING SYSTEM by C. A. Bender et al., still pending, and owned by the assignee of the present invention). LAPI uses a basic "Active Message Style" mechanism which provides a one-sided communications model. The library provides a relatively small set of fixed functions (e.g. LAPI_Get, LAPI_Put) and a general Active Message function which allows users to supply extensions by means of additions to the notification handlers.

Figure 3:
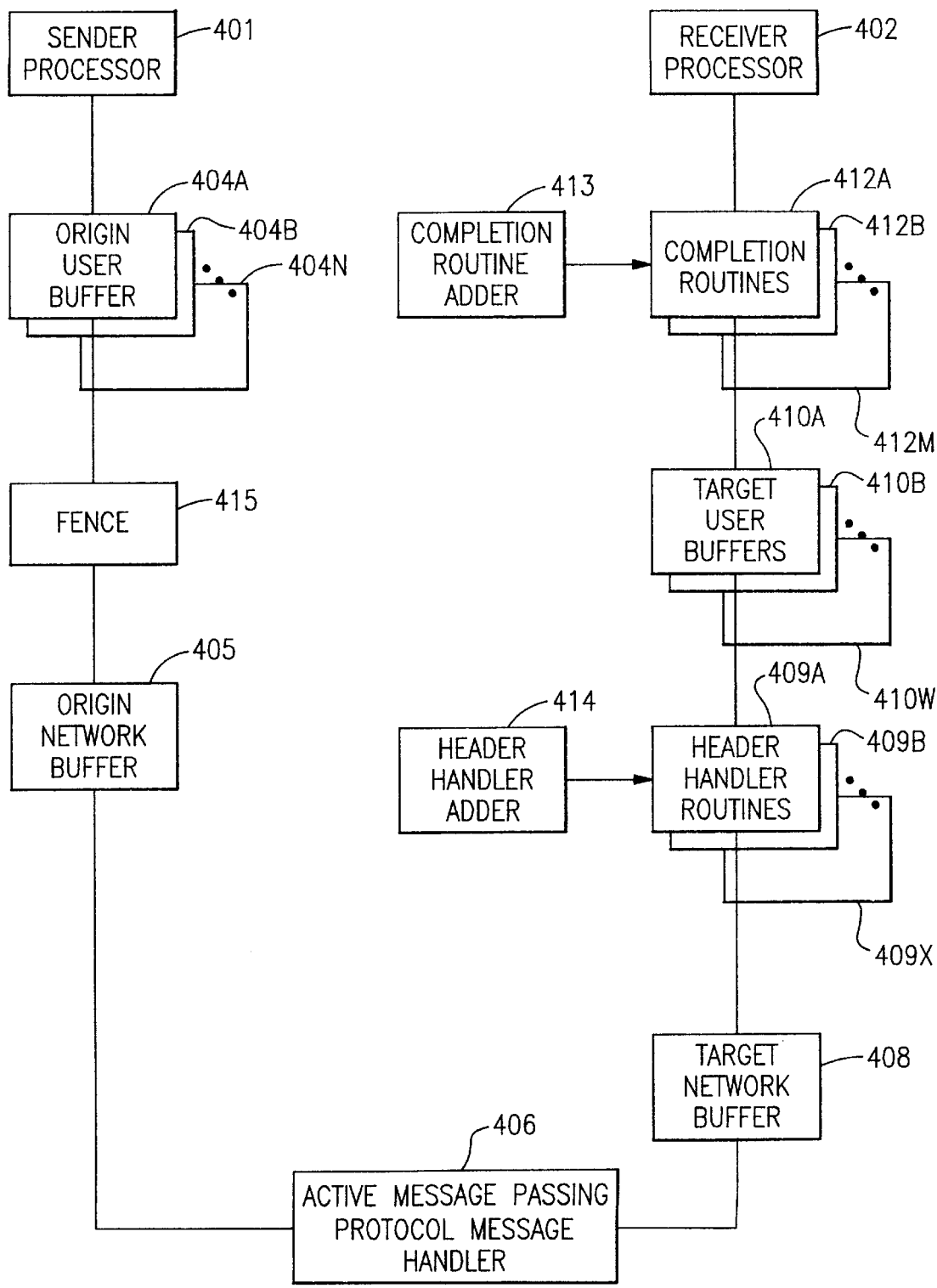
FIG. 3 is a block diagram showing the sending of messages from a sender processor to a receiver processor in the system of FIG. 1.

FIG. 3 is a block diagram illustrating the communication low-level application programming interface of the present invention. As shown in FIG. 3, the present embodiment includes a sender or source processor 401 and a receiver or target processor 402. The sender processor 401 is connected to sender or origin user buffers 404A to 404N from which a user messages are sent. The sending of user messages from one or the origin user buffers 404A to 404N may be controlled, when present, by a fence 415, to be discussed. A copy of the user message is then packetized in a network buffer 405. An active message passing protocol message handler 406 transfers the user message in packets from the origin network buffer 405 to a receiver or target network buffer 408. LAPI is informed when a message is received in the receiver network buffer 408. LAPI then invokes one of the header handler routines 409A to 409X. The proper header handler routine 409A to 409X to be invoked is indicated in each packet of the message handler by, for instance, a name or address pointing to the location of the header handler routine. The header handler then indicates to LAPI which one of receiver or target user buffers 410A to 410W the user message data is to be stored in, and further indicates which of the completion routines 412A to 412M is to complete the transfer of the user message. LAPI then transfers the user message data from the target network buffer 408 to the indicated target user buffer 410. When the last user message packet is received, LAPI queues the indicated completion routine 412 in one of one or more completion handler queues which, when executed, completes the transfer. The target user buffer may be a null buffer when the message is a command or other message that does not require a target buffer. Similarly, the completion routine may be a null routine when the transfer is completed by the header handler.

The sender processor 401 and receiver processor 402 may each be, for instance, one of the nodes 106 of FIG. 1. It will be understood that messages may be transmitted in either direction between nodes. For example, a message may be sent from the sender 401 to the receiver 402. Also, however, a message may be sent from 402 to 401, in which case 402 becomes the sender and 401 is the receiver.

The completion routines may be tailored to be executed by the receiver processor 402. For instance, even though in the present embodiment, all of the work stations of the nodes 106 are typically the same, a system is envisioned in which the nodes may be different workstations, or even different data processing devices having differing operating systems.

In that case, the completion routine is tailored for the particular processor and operating system present at the receiver, and may vary from node to node. Also, since different completion routines, which may be application programs for processing the message data, are present at the receiver, a routine 413 is provided to add to or increase the completion routines 412A to 412M at the receiver, as desired. Similarly, a header handler adder mechanism 414 is provided to add to or increase the header handler routines 409A to 409X at the receiver, as desired. As will be explained, part of the initialization routine for LAPI is to exchange addresses from the receiver to the sender.

In the present embodiment, the header handler indicates the completion routine, if any, which processes the message data. This may be done by including in the header handler, a name of the completion routine desired, an address where the completion routine may be found by the receiver processor, or other means, as is well known to those skilled in the art.

If more than one user message is consecutively transmitted from the sender 401 to the receiver 402, the user messages may arrive at the receiver 402 over the network in any order. A fence 414 may be included in the sender, and the user messages are divided into sets. The set being handled by the message handler 406 is indicated to the fence 414, such as by tokens. If a user message to be sent does not have the proper token, it is not sent until after all of the user messages in the present set have been transmitted and received. In this way, the user messages in the present set are transmitted and placed in the correct user buffer 410, regardless of the order in which the user messages are received.

All user messages are received in the network buffer 408. The receiver user messages may then be placed in one or more user buffers 410, and the user message data is processed by an indicated one of the completion routines at 412, as discussed. The network buffer 408, user buffers 410A to 410W and internal resources, to include completion handler queues, various tables, counters and buffering, may be referred to as receiver resources. If any of the receiver resources are unable to accommodate additional user messages, the sending of additional user messages must be suspended until the receiver resources are again able to handle more user messages. This is done by throttling.

LAPI solves the problem for the case where the rate at which completion routines 412 are started up may be faster than the rate at which they complete. In this situation any buffering (in internal resources) that is provided is bound to get filled. LAPI solves this problem by throttling the sender 401 of these messages. This is done by throttling the sender

401 to not send acknowledgments back for the last network packet of a message that requires a completion routine 412. Thus, the sender 401 cannot complete this message and will resend the unacknowledged packet. When the resent packet arrives, the receiver 402 will check if the required buffer space is now available. If there is available space, the completion routine 412 will be scheduled and the incoming packet acknowledged. If buffering space is still not available, the packet is again ignored (i.e. an acknowledgement is not sent). Thus, the recovery mechanism is used to solve the buffering problem of the completion handler queue.

It will be understood that the acknowledgment (which is an internal message used to control message passing) is sent outside of the critical path of the message passing operation. The user message transmission process, from the start of sending a user message from the sender to the receiver, the receipt of the user message in the network buffer 408, and the placing of the user message in a user buffer 410 by the header handler, has priority over the transmission of internal messages such that user messages do not have to wait for the transmission of internal messages.

Since the processor 402 may also act as a sender to send user messages to the processor 401, if a user message is to be sent to processor 401, and an internal message also has to be sent from processor 402 to 401, some of the internal message may be included with, or "piggybacked", with user messages to reduce the number of messages being sent from node to node.

Since the handling of internal messages causes an interrupt which is disruptive to the operation of the processors of the nodes, the present invention provides a mechanism to increase the number of internal messages that may be handled by a single interrupt. When the sender generates an operation by sending a message, the sender will know how many internal messages will be returned as a result of the operation being generated. Thus, the sender sets a threshold for the message handler 406 which does not raise an interrupt until the expected number of internal messages have been returned. In this way, the number of interrupts are reduced, and a number of internal messages may be handled by a single interrupt.

The LAPI is a non-standard application programming interface designed to provide optimal communication performance on the SP Switch. It is based on an "active message style" programming mechanism that provides a one-sided communications model (that is, one process initiates an operation and the completion of that operation does not require any other process to take a complementary action). The LAPI library provides PUT and GET function and a general "active message" function that allows programmers to supply extensions by means of additions to the notification handlers. The LAPI is designed for use by libraries and power programmers for whom performance is more important than code portability.

The LAPI provides the following advantages:
Performance—The LAPI provides basic function for optimal performance. It is designed to especially provide low latency on short messages.
Flexibility—The LAPI's one-sided communications model provides flexibility because the completion of an operation by one process does not require any other process to take a complementary action. Also, the LAPI provides a more primitive interface (than either the MPI or IP) to the SP Switch, giving the programmer the choice of how much additional communications protocol needs to be added.
Extendibility—The LAPI supports programmer-defined handlers that are invoked when a message arrives. Programmers can customize the LAPI to their specific environments.

General characteristics provided by LAPI are:
Reliability—The LAPI provides guaranteed delivery of messages. Errors not directly related to the application are not propagated back to the application.
Flow control
Support for large messages
Non-blocking calls
Interrupt and polling modes
Efficient exploitation of switch function
By default, ordering is not guaranteed General LAPI Functions
LAPI functions are divided into three parts:
1. A basic "active message" infrastructure that allows programmers to install a set of handlers that are invoked and executed in the address space of a target process on behalf of the process originating the active message. This generic interface allows programmers to customize the LAPI function to their unique environment.
2. A set of defined functions that is complete enough to satisfy the requirements of most programmers. These defined functions make the LAPI more usable and at the same time lend themselves to efficient implementation because their syntax and semantics are known.
3. A set of control functions for the initialization and eventual orderly shutdown of the LAPI layer.

Understanding the LAPI
To help you achieve a fuller understanding of the LAPI, this section presents further details on the "active message" infrastructure and the defined set of functions. In addition, concepts important to understanding the LAPI are explained.

The "Active Message" Infrastructure
"Active message" was selected as the underlying infrastructure for the LAPI. The "active message" infrastructure has the following characteristics:
The "active message" includes the address of a user-specified handler. When the active message arrives at the target process, the specified handler is invoked and executes in the address space of the target process.
The "active message" optionally may also bring with it the user header and data from the originating process.
Operations are unilateral in the sense that the target process does not have to take explicit action for the active message to complete.
Storage buffers for arriving data need to be provided by the invoked handler.

Writing Handlers
The ability for programmers to write their own handlers provides a generalized, yet efficient, mechanism for customizing the interface to one's specific requirements. The user is responsible for protecting shared structures and buffers where necessary by using the locking structures available in the AIX (the IBM version of the UNIX operating system) p-threads library.

The LAPI supports messages that can be larger than the size supported by the underlying SP Switch subsystem. Therefore, the data sent with the "active message" may arrive at the target in multiple packets and, further, these packets can arrive out of order. This situation places some requirements on how the handler is written.

When the "active message" brings with it data from the originating process, the architecture requires that the handler be written as two separate routines:
1. A "header handler" function. This function is specified in the "active message" call. It is called when the message first arrives at the target process and provides the LAPI dispatcher (the part of the LAPI that deals with the arrival of messages and invocation of handlers) with an address where the arriving data must be copied, the address of the optional "completion handler," and a pointer to the parameter that will be passed to the "completion handler".
2. A "completion handler" that is called after the whole message has been received.

An Example of LAPI "Active Message" Function

In this example, a programmer writes a handler for the LAPI "active message" interface. Refer to IBM Parallel System Support Programs for AIX: Command and Technical Reference for more information on the LAPI_Amsend subroutine.
1. The desired function (accumulate) is to add vector (S) to another (D) on the target node and put the results in the vector at the target:

$$D[0\ldots N-1]=D[0\ldots N-1]+S[0\ldots N-1i]$$

where,
S[N] is a vector of length N in the address space of the origin process (origin_process)
D[N] is a vector of length N in the address space of the target process (target_process)
2. The generic "active message" call is defined as LAPI_Amsend (hndl, tgt, hdr_hdl, uhdr, uhdr_len, udata, udata_len, tgt_cntr, org_cntr, cmpl_cntr)
3. Before making the active message call, you must obtain the address of the target counter (target_cntr_addr) and the address of the header handler to be executed on the target process (accumulate_addr). The address of the header handler is obtained by the LAPI_Address_init function.
4. Initialize the udhr based on the header expected by accumulate. For example, the structure of udhr could be:

```
typedef struct {
    void target_addr;
    uint length;
} put_add_hdr_t;
put_add_hdr_t uhdr;
uhdr.target_addr = D;
uhdr.length = N;
```

5. Make the specific call
LAPI_Amsend (hndl, target_process, accumulate_addr, &uhdr, sizeof(put_add_hdr_t), &S[0], N sizeof(S[3]), target_cntr_addr, &origin_cntr, &completion_cntr)
6. When this message is received at the target (assuming that the entire origin data is contained within a packet), the accumulate handler you specified is invoked by the dispatcher. The structure of the header handler is:
void header_handler (lapi_handle_t hndl, void uhdr, uint uhdr_len, uint msg_len,
completion_handler_t, completion_handler, void user_info)
The structure of the completion handler is:
void completion_handler (lapi_handle_t hndl, void user_info)
7. If any state information about the message is required by the completion handler, the information required must be saved in a user buffer by the header handler. The header handler passes the address of this buffer to the dispatcher through the parameter user info. The dispatcher uses this pointer as a parameter (user_info) for the completion handler.
8. For this example operations performed at the target process are:
Within the dispatcher:
a. The LAPI header is read.
b. uhdr and uhdr_len are extracted from the LAPI header.
c. The header handler is invoked.
buf=(accumulate_addr)(hndl, uhdr, uhdr_len, msg_len, &completion_handler, &user_info);
d. udata is copied into buf.
e. The completion handler is invoked.
completion_handler)(&hndl, user_info);
Note: If the message was not contained within a packet, the LAPI layer will save the necessary information and will invoke the completion handler after all the udata has arrived and copied into buf User defined functions:
Header handler:
accumulate(hndl, uhdr, uhdr_len, msg_len, completion handler,
{buf=addr where incoming data should be buffered save (target_addr=D, length=N, buf) in user_info completion_handler=complete_accumulate return buf}
Completion handler:
complete_accumulate (hndl, user_info)
{retrieve required data (namely D,N and buf) from user_info; for (i=0; i<N; i++) D[i]=D[i]+buf [i]; return}
The accumulate handler is the header handler and is called by the LAPI layer when the message first arrives at the target process. The header handler saves the information required by complete_accumulate (target-addr, length, and buf) in user_info and passes back a pointer to the complete_accumulate handler as user_info. Additionally, the header handler returns address of a buffer buf.

Large active messages are generally transferred as multiple packets. In this case the LAPI layer stores the incoming data in the packets as they arrive into buf. When all the data has been received, it calls the complete accumulate function which uses user_info to access the two vectors, adds them and stores them at the desired location. After the return from the complete_accumulate routine, the LAPI layer increments tgt_ctr. The origin_cntr is incremented when it is safe to return the origin buffer back to the user.

The cmpl_cntr is incremented after the completion handler has completed execution. The cmpl_cntr, therefore, is a reflection, at the origin, of the tgt_cntr.

The Defined Set of Functions

Fundamentally, the defined set of functions for the LAPI provides a Remote Memory Copy (RMC) interface. The primary characteristics of the defined set of functions provided by LAPI are:

The basic data transfer operations are memory to memory copy operations that transfer data from one virtual address space to another virtual address space.

The operations are unilateral. That is, one process initiates an operation and the completion of the operation does not require any other process to take some complementary action. (This is unlike a send and receive operation, where a send requires a complementary receive with matching parameters to be posted for completion.)

The operations support both "pull" and "push". The LAPI_Get operation copies data from the address space of the target process into the address space of the origin process. The LAPI_Put operation copies data into the address space of the target process from the address space of the origin process.

The initiating process specifies the virtual address of both the source and destination of the data (unlike a send and receive process where each side specifies the address in its own address space). To avoid the limitation of requiring that the address maps on the different processes be identical, the LAPI provides the LAPI_Address_init mechanism by which the different communicating processes can exchange information regarding the address map of shared data objects.

Because data transfer operations are unilateral and no synchronization between the two processes is implied, additional primitives are provided for explicit process synchronization when it is necessary for program correctness.

Functions are provided to detect completion and to enforce ordering.

Important LAPI Concepts

To use the LAPI, it is important to understand the following concepts:

Origin and target

Blocking and non-blocking calls

Completion of communication operation

Message ordering and atomicity

Error handling

Progress

Origin and Target

"Origin" denotes the task (or process or processor) that initiates a LAPI operation (PUT, GET, or "active message".). "target" denotes the other task whose address space is accessed. Although multiple tasks may run on a single node, it is convenient to think of each task as running on a different node. Therefore the origin task may also be referred to as the "origin node" and the target task as the "target node". The origin and target can be the same for any of the calls, but if the origin and target data areas overlap, the results are undefined.

Blocking and Non-Blocking Calls

A blocking procedure is one that returns only after the operation is complete. There are no restrictions on the reuse of user resources.

A non-blocking procedure is one that may return before the operation is complete and before the user is allowed to reuse all the resources specified in the call. A non-blocking operation is considered to be complete only after a completion testing function, such as LAPI_Waitcntr or LAPI_Getcntr, indicates that the operation is complete.

Completion of Communication Operation

A communication operation is considered to be complete, with respect to the buffer, when the buffer is reusable.

A PUT is complete with respect to the origin buffer when the data has been copied out of the buffer at the origin and may be overwritten. A GET is complete with respect to the origin buffer when that origin buffer holds the new data that was obtained by GET.

A PUT is complete with respect to the target buffer when the new data is available at the target buffer. A GET is complete with respect to the target buffer when the data has been copied out of the buffer at target and the target task may overwrite that buffer.

Communication Behaviors: Two communication behaviors support two different definitions of "completion":

In standard behavior, a communication operation is defined as complete at the origin task when it is complete with respect to the origin buffer; it is complete at the target task when it is complete with respect to the target buffer.

In synchronous behavior, a communication operation is defined as complete at the origin task when it is complete with respect to both the origin buffer and target buffer. It is complete at the target task when it is complete with respect to the target buffer.

The LAPI defines both standard and synchronous behaviors for PUT operations. The LAPI defines only synchronous behavior for GET operations.

Message Ordering and Atomicity

Two LAPI operations that have the same origin task are considered to be ordered with respect to the origin if one of the operations starts after the other has completed at the origin task. Similarly, two LAPI operations that have the same target task are considered to be ordered with respect to the target if one of the operations starts after the other has completed at the target task. If two operations are not ordered, they are considered concurrent. The LAPI provides no guarantees of ordering for concurrent communication operations. The LAPI does provide mechanisms which an application can use to guarantee order.

As an example, consider the case where a node issues two standard behavior PUT operations to the same target node, where the targets overlap. These two operations may complete in any order, including the possibility of the first PUT overlapping the second, in time. The contents of the overlapping region will be undefined, even after both PUTs complete. Using synchronous behavior for both PUT operations, (waiting for the first to complete before starting the second) will ensure that the overlapping region contains the result of the second after both PUTs have completed.

Error Handling

If an error occurs during a communications operation, the error may be signaled at the origin of operation, or the target or both. Some errors may be caught before the communication operation begins, and these will be signaled at the origin. However, some errors will not occur until the communication is in progress (a segmentation violation at the target, for example); these may be signaled at either or both ends of the communication.

Progress

All LAPI operations are unilateral by default and can complete successfully or fail, independent of the actions of other tasks. Specifically, a LAPI operation to a particular target should complete even if the target is stuck in an infinite loop (that is, when the target process is in interrupt mode).

Using the LAPI

In general, LAPI functions:

Are non-blocking calls

Provide both polling and interrupt mode

Signal completion by incrementing counters at each end

Provide both C and Fortran bindings

Complementary functions provide for checking completion of operations and for enforcing relative ordering if required. Additionally, functions allow processes to exchange addresses that will be used in LAPI operations.

Specific LAPI Functions

The LAPI provides the following specific functions.

Active Message Active message function (LAPI_Amsend) is a non-blocking call that causes the specified active message handler to be invoked and executed in the address space of the target process. Completion of the operation is signaled if counters are specified. Both standard and synchronous behaviors are supported. The LAPI_Amsend function provides two counters (org_cntr and cmpl_cntr) which can be used to provide the two behaviors. The org_cntr is incremented when the origin buffer can be reused (standard). The cmpl_cntr is incremented after the completion handler has completed execution (synchronous).

Data Transfer

Data transfer functions are non-blocking calls that cause data to be copied from a specified region in the origin address space to the specified region in the target address space (in the case of a LAPI_Put operation) or from a specified region in the target address space to a specified region in the origin address space (in the case of a LAPI_Get operation). Completion of the operation is signaled if counters are specified. Both standard and synchronous operations are supported for PUT. Only synchronous operation is possible in the case of GET. Standard PUT is provided by incrementing the org_cntr when the origin buffer can be reused.

Synchronous PUT is provided by incrementing the cmpl cntr after the data has been written into the target buffer. The LAPI_Getcntr (or LAPI_Waitcntr) function should be used in conjunction with the org_cntr and cmpl_cntr counters to guarantee the respective standard and synchronous behavior of the LAPI PUT operations.

Synchronizing

The LAPI_Rmw function is used to synchronize two independent operations such as two processes sharing a common data structure. The operation is performed at the target process and is atomic. The operation takes a variable from the origin and performs one of four selected operations on a variable from the target and replaces the target variable with the results of the operation. The original value of the target variable is returned to the origin. LAPI_Rmw provides four different read/modify/write (rmw) operations:

SWAP
COMPARE_AND_SWAP
FETCH_AND_ADD
FETCH_AND_OR

Completion is signaled at the origin if the counter is specified.

Completion Checking

The following counter functions provide the means for a process to manage the completion state of the LAPI operations.

LAPI_Waitcntr—Wait on a counter to reach a specified value and return when the counter is equal to or greater than that value (blocking)

LAPI_Getcntr—Get the current value of a specified counter (non-blocking)

LAPI Setcntr—Set the counter to a specified value

These functions also provide an efficient means to order the flow of LAPI operations or the use of certain user managed resources (for example, buffers). For example, a series of PUTs to a single target and buffer requires that the contents of the buffer at the target remains in step with the order of execution of the PUTs at the origin. Using the cmpl_cntr counter in the LAPI_Put function in conjunction with the LAPI_Waitcntr function provides the necessary ordering.

Ordering

LAPI_Fence and LAPI_Gfence operations provide a means to enforce the order of execution of LAPI functions. LAPI functions initiated prior to these fencing operations are guaranteed to complete before LAPI functions initiated after the fencing functions. LAPI_Fence is a local operation which is used to guarantee that all LAPI operations initiated by the local process and the same process thread are complete. LAPI_Gfence is a collective operation involving all processes in the parallel program. LAPI_Gfence provides a barrier operation for the parallel program. Both LAPI_Fence and LAPI_Gfence operations are a data fence that guarantee that the data movement is complete. These are not an operation fence which would need to include "active message" completion handlers completing at the target.

Progress

The LAPI_Probe function is used in polling mode to transfer control to the communication subsystem in order to make progress on arriving messages.

Address Manipulation

The LAPI_Address_init collective operation allows processes to exchange operand addresses of interest. Such function is required if the processes do not have identical address maps. The LAPI_Address is used by Fortran programs when an address needs to be stored in an array. In Fortran there is no concept of "address" (as there is in the C language) and this function gives that ability to Fortran.

LAPI Setup

LAPI_Init and LAPI_Term operations are used to initialize and terminate the communication structures required to effect LAPI communications for a specific instance of LAPI. LAPI_Init returns a unique handle which is used to associate a communication channel with the LAPI instance. This handle is subsequently passed as a parameter to each of the other LAPI functions. The LAPI_Term function is used to terminate a specific instance of LAPI.

Error Handling and Messages

The LAPI_Init function provides a means for the user of LAPI to register an error handler. This error handler is specified as part of the lapi_info structure parameter which is passed to the LAPI_Init function. The LAPI_Msg_String function provides the means to translate a LAPI call return code value (integer) into a message string.

LAPI Environment

The LAPI_Qenv function is used to query the state of the LAPI communications subsystem. The LAPI_Senv function allows the programmer to specify the value of some of the LAPI communications subsystem's environment variables. An important value that can be specified is the interrupt state. The interrupt state is set by specifying INTERRUPT_SET as on (for interrupt mode) or off (for polling mode). The default setting for INTERRUPT_SET is on.

The LAPI Execution Model

The goal of LAPI is to provide a threads-safe environment and support an execution model that allows for maximum execution concurrency within the LAPI library.

Using the setup function (LAPI_Init), a user process establishes a LAPI context. Within a LAPI context, the LAPI library is threads-safe, and multiple threads may make LAPI calls within the same context. The different calls may execute concurrently with each other and with the user threads. However, in reality execution concurrency among these calls is limited by the locking required with LAPI to maintain integrity of its internal data structures and the need to share a single underlying communication channel.

As with any multi-threaded application, coherence of user data is the responsibility of the user. Specifically, if two or more LAPI calls from different threads can execute concurrently and if they specify overlapping user buffer areas, then the result is undefined. It is the responsibility of the user to coordinate the required synchronization between threads that operate on overlapping buffers.

The user application thread, as well as the completion handlers, cannot hold mutual exclusion resources before making LAPI calls; if they do, it is possible to run into deadlock situations.

Because user-defined handlers may be called concurrently from multiple threads, it is the user's responsibility to make them threads-safe.

Figure 4:
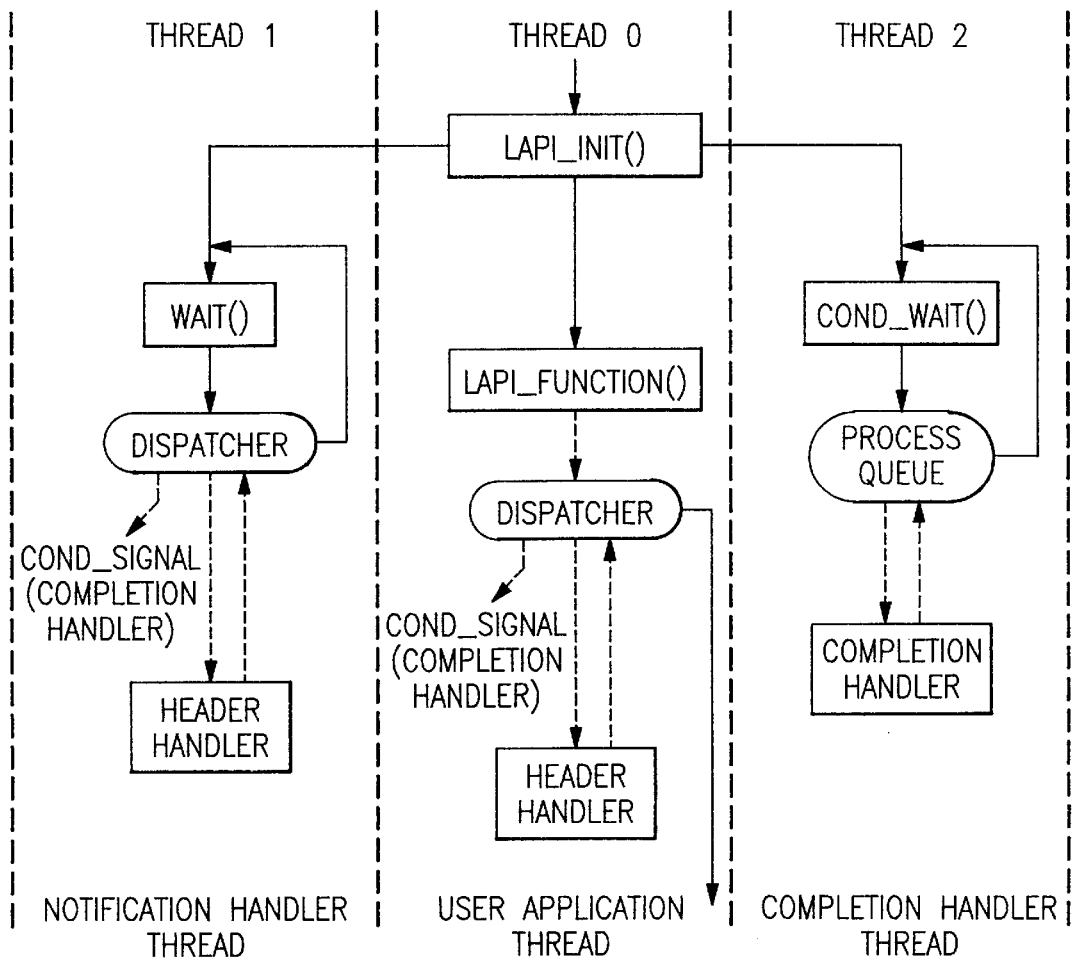
FIG. 4 is thread model showing the creation of a second thread from the user application thread to process notification events and invoke the LAPI handlers of the present invention.

From the user application thread a second thread is created by LAPI_Init to process notification events and invoke the LAPI handlers as illustrated in FIG. 4.

The application thread, notification thread and the completion handler thread are shown in FIG. 4.

Threads 0 and 1 (the application thread and the notification thread) attempt to invoke the LAPI dispatcher whenever possible; in this way, progress on incoming and outgoing messages can be made while minimizing additional overhead. Most LAPI calls (though not all) made by the application thread also result in the LAPI dispatcher being automatically run. The notification thread waits in the Kernel for the occurrence of a notification event. When an event occurs, the Kernel wakes up the waiting thread. As shown in FIG. 4, after the notification thread returns from waiting in the Kernel, it invokes the LAPI dispatcher.

The LAPI Dispatcher is the central control point that orchestrates the invocation of functions and threads necessary to process outstanding incoming and outgoing LAPI messages.

The LAPI Dispatcher can run from the application's user's thread, from the notification thread or from the completion handler thread. Locking is used to ensure that only one instance of the dispatcher runs at a time to maintain integrity. On incoming messages, the LAPI dispatcher manages the reassembly of data from different packets (which may arrive out-of-order) into the specified buffer, and then invokes the completion handler if necessary.

Thread 2 is created by LAPI_Init to execute completion handlers associated with "active messages". Completion handlers are written by users and may make LAPI function calls which in turn will invoke the LAPI Dispatcher. The completion handler thread processes work from the completion handler queue. When the queue is empty the thread waits using a pthread_cond_wait(). If an active message (LAPI_Amsend) includes a completion handler, the dispatcher queues a request on the completion queue after the whole message has arrived and has been reassembled in the specified buffer; the dispatcher then sends a pthread_cond_ signal to the completion handler thread. If this thread was in a wait state it will begin processing the completion handler queue, otherwise, if it was not waiting, the thread signal is ignored.

LAPI handlers are not guaranteed to execute one at a time. It is important to note, however, that LAPI calls may execute concurrently with the origin or target or both. The same restrictions stated previously about not holding on to mutual exclusion resources when making LAPI calls still applies.

This discussion of a threads-safe environment and maximum execution concurrency within the LAPI library applies to both the polling and interrupt modes. In polling mode any calls to the communication library attempt to make progress on the context specified in the call. Further, the function LAPI_Probe is provided to allow applications to explicitly check for and handle incoming messages.

The execution model of the handlers consists of the following events:

Event Action

Message Arrival

Copies the message from the network into the appropriate data access memory space.

Interrupt/Poll

Causes an interrupt if required, based on the mode.

Dispatcher Start

Invokes the dispatcher.

New Message Packet

Checks the LAPI header and determines (by checking the receive state message reassembly table) if the packet is part of a pending message or if it is a new message. Calls the header-handler function.

Return from Header-Handler

If the message is contained in more than one packet, the LAPI Dispatcher will log that there is a pending message, save the completion handler address, and save the user's buffer address to be used during the message reassembly of pending message packets.

Pending Message Packet

Copies the message to the appropriate portion of the user buffer specified through the header-handler. If the packet completes the message, the dispatcher queues the completion handler; otherwise the dispatcher returns to check for message arrivals.

Completion Handler

When the completion handler is executed, (after the return from the completion handler) updates the appropriate target counter before continuing.

Allocating Buffers

1. The user allocates as many buffers per origin as wanted.

Rule: At origin, if the target buffer allocation is exhausted, wait for the counter of previous requests.

Example: Use >=P buffers (one per origin). At origin with one request pending. Wait on counter before issuing next request.

2. If the header handler blocks, no further progress is made, including messages pending (that is, the communications adapter is stalled).

When the order of execution between any two LAPI functions within one task of a parallel program needs to be guaranteed, using LAPI_Waitcntr between the two LAPI functions will usually be more efficient than LAPI_Fence. LAPI_Fence requires that all LAPI operations initiated on the current thread before the LAPI_Fence be completed before any LAPI operation after the fence is allowed to start. LAPI_Waitcntr can be used to indicate the completion of a single LAPI function which had been initiated on the current thread before the LAPI_Waitcntr.

The scope of LAPI_Fence is per thread. For example, a LAPI_Fence which is issued from the completion handler thread will only guarantee that no LAPI operations initiated after the fence (on the completion handler thread) will start until all LAPI operations initiated before the fence have completed. In this case there are no guarantees about the order of LAPI operations initiated from the main application thread.

LAPI_Waitcntr can be used to indicate the completion of a single LAPI function which may have been initiated from an alternate thread (completion handler) within the same task. Therefore the possibility exists to use LAPI_Waitcntr to wait for the completion of another LAPI function which is initiated after the call to LAPI_Waitcntr.

LAPI_Waitcntr can be used to guarantee order of execution of LAPI_Amsend operations which are initiated from a single origin task. When LAPI_Amsend operations use the cmpl_cntr counter, this counter is incremented after the completion counter (or header handler if a completion handler is not specified) has executed at the target task. LAPI_Fence and LAPI_Gfence do not provide an indication that LAPI_Amsend operations have completed execution at the target.

LAPI_Waitcntr is a blocking call. If a user prefers to avoid this blocking operation a program loop comprised of the sequence LAPI_Getcntr a check of the value returned from Get LAPI_Probe will provide an equivalent logical operation and provide the user with added flexibility.

LAPI_Init must be called before any thread (the main thread or the completion handler thread) can make a LAPI call. In addition to this, LAPI_Address_init or LAPI_Gfence should be the second LAPI call. These two functions provide a barrier which guarantees that all other LAPI tasks have initialized their LAPI subsystems and are ready to receive requests from remote tasks. Failure to provide these barrier functions may result in dropped switch packets, low performance at start-up and unnecessary switch congestion. The instance of the LAPI subsystem should be quiesced before LAPI_Term is called to terminate the LAPI instance. This can be done by calling LAPI_Gfence before LAPI_Term.

```
LAPI Programming Example
Active Message (C)
This C program is an example of the use of the LAPI
active message call:
/*
** Example Program illustrating use of the LAPI Active
** Message Call
*/
#include <pthread.h>
#include <lapi.h>
#define A_MAX      2
#define I_MAX      10
typedef struct { /* header for active message handler*/
    compl_hndlr_t    *cmpl_hndlr;              /* pointer to completion
                                                  handler */
    int              uinfo;                    /* uinfo passed to -- */
} usrhdr_t;                                    /* the completion handler */
volatile int cont=0;
/*
**      Function:      The completion handler for the active call.
**                     This is invoked at the target after all the
**                     data of the active message send
**                     (LAPI_Amsend) call have reached the target.
**      Parameters:    hndl ->                 pointer to the handle for the
**                                             LAPI context
**                     param ->                pointer to the user param
**                                             (specified by user in the
**                                             header handler function)
*/
void
do_get(lapi_handle_t *hndl, void *param)
{
    int loop, rc;
    int *buf;
    buf = (int *) param;
    printf("In Completion Handler: Result of AM call\n");
    /* Print Updated buffer */
    for (loop=0; loop < I_MAX; loop++) {
        printf("val[%d] = %d\n", loop, buf[loop]);
    }
    cont= 1;
}
/*
**      Function:      User's active message header handler.
**                     This is invoked at the target when the
**                     active message first arrives at the target
**      Parameters:    hndl ->                 pointer to the handle for the
**                                             LAPI context
**                     uhdr ->                 pointer to the user header
**                     uhdrlen ->              pointer to the length of the
**                                             user header
**                     msglen ->               pointer to the length of the
**                                             message
**                     compl_hndlr ->          pointer to the completion
**                                             handler function pointer.
**                                             This is be set by the user
**                                             in this function
**                                             (CAN be NULL)
**                     saved_info ->           pointer to the user_info.
**                                             This is set by the user
**                                             in this function. This
**                                             parameter is then passed to
**                                             the completion handler when
**                                             the completion handler
**                                             is invoked.
```

-continued

```
*/
void *
hdr_hndlr(lapi_handle_t *hndl, void *uhdr, uint *uhdrlen,
      uint *msglen, compl_hndlr_t **cmpl_hndlr,
      void **saved_info)
{
    void            *buf;
    usrhdr_t        *vhdr;
        printf("In Header Handler\n");
    vhdr         = (usrhdr_t *) uhdr;
    *cmpl_hndlr  = (compl_hndlr_t *) vhdr->cmpl_hndlr;
    *saved_info  = (void *) vhdr->uinfo;
    buf          = (void *) vhdr->uinfo;
        return (buf);
}
int
main(int argc, char **argv)
{
    lapi_handle_t  t_hndl;              /* LAPI context hndl - returned */
    lapi_info_t    _info;                /* LAPI info structure */
    int            task_id,              /* My task id */
                   num_tasks;            /* Number of tasks in my job */
    lapi_cntr_t    l_cntr;               /* Origin counter */
    lapi_cntr_t    _cntr;                /* Target counter */
    lapi_cntr_t    c_cntr;               /* Completion counter */
    int            t_buf[I_MAX];         /* Buffer to manipulate */
    void           *global_addr[A_MAX];  /* Array to store */
                                         /* t_buf addr frrom all the tasks. */
                                         /* The size of this array needs */
                                         /* to each number of tasks */
    void           *tgt_addr[A_MAX];     /* Array to store target */
                                         /* counter addr from all the tasks. */
    void           *hndlr_addr[A_MAX];   /* Array to store */
                                         /* header handlers */
    void           *cmpl_hndlr_addr[A_MAX]; /* Address of */
                                         /* completion handler */
    usrhdr_t       uhdr;                 /* Store Header Handler information */
    void           *uhdr, *udata;
    int            uhdrlen, udatalen;
    int            loop, rc, tgt, val, cur_val;
    char           err_msg_buf[LAPI_MAX_ERR_STRING];
    t_info.err_hndlr = NULL;             /* Not registering error */
                                         /* handler function */
    if ((rc = LAPI_Init(&t_hndl,&t_info))!=LAPI_SUCCESS) {
        LAPI_Msg_string(rc, err_msg_buf);
        printf("Error Message: %s, rc = %d\n",
            err_msg_buf, rc);
        exit (rc);
    }
        /* Get task id within job */
    rc = LAPI_Qenv(t_hndl, TASK_ID, &task_id);
        /* Get no. of tasks in job */
    rc = LAPI_Qenv(t_hndl, NUM_TASKS, &num_tasks);
    if (num_tasks != 2) {
        printf("Error Message: Program should run "
            "on 2 nodes\n");
        exit(1);
    }
    /* Turn off parameter checking - default is on */
    rc = LAPI_Senv(t_hndl, ERROR_CHK, 0);
    /* Initialize counters to be zero at the start */
    rc = LAPI_Setcntr(t_hndl, &l_cntr, 0);
    rc = LAPI_Setcntr(t_hndl, &t_cntr, 0);
    rc = LAPI_Setcntr(t_hndl, &c_cntr, 0);
    /*
    ** Exchange buffer address, tgt_cntr address and
    ** hdr_hndlr address and completion handler address
    ** of every task. Collective calls
    */
    rc = LAPI_Address_init(t_hndl, t_buf, global_addr);
    rc = LAPI_Address_init(t_hndl, &t_cntr, tgt_addr);
    rc = LAPI_Address_init(t_hndl, (void *)&hdr_hndlr,
            hndlr_addr);
    rc = LAPI_Address_init(t_hndl, (void *)&do_get,
            cmpl_hndlr_addr);
    if (task_id == 0) {  /* Task id is 0, Origin */
        tgt = task_id + 1;
        for (loop=0;loop<I_MAX;loop++) {/* Update buffer */
        t_buf[loop] = task_id - loop;
```

```
}
    /* Global fence to sync before starting */
rc = LAPI_Gfence(t_hndl);
/* Fill in uhdr and udata buffers for AM call */
t_uhdr.cmpl_hndlr =
        (compl_hndlr_t *) cmpl_hndlr_addr[1];
t_uhdr.uinfo   = (int)global_addr[tgt];
uhdr           = (void *)&t_uhdr;
uhdrlen        = sizeof(usrhdr_t);
udata          = (void *) t_buf;
udatalen       = L_MAX*sizeof(int);
rc = LAPI_Amsend(t_hndl, tgt, hndlr_addr[tgt],
        uhdr, uhdrlen, (void *) udata,
        udatalen, tgt_addr[tgt],
        &l_cntr, &c_cntr);
/* Wait for local AM completion */
rc = LAPI_Waitcntr(t_hndl, &l_cntr, 1, &cur_val);
/* Can now change local buffer */
for (loop=0;loop<L_MAX;loop++) {/* Update buffer */
    t_buf[loop] = loop * task_id;
}
/* Wait for target AM completion */
rc = LAPI_Waitcntr(t_hndl, &c_cntr, 1, &cur_val);
printf("Node %d, done issuing AM to node %d\n",
    task_id, tgt);
rc = LAPI_Gfence(t_hndl);
rc = LAPI_Get(t_hndl,tgt,L_MAX*sizeof(int),
        global_addr[tgt],(void *)t_buf,
        tgt_addr[tgt],&l_cntr);
/* Wait for local Get completion */
rc = LAPI_Waitcntr(t_hndl, &l_cntr, 1, NULL);
printf("Node %d, done issuing Get from node %d\n",
    task_id, tgt);
printf("Result of Get after the Am from node %d:\n",
    tgt);
for (loop=0;loop<L_MAX;loop++) {/* Update buffer */
    printf("Val[%d] = %d\n", loop, t_buf[loop]);
}
} else { /* Task id is 1 , Target */
    tgt = task_id - 1;
    for (loop=0;loop<L_MAX;loop++){/* Zero out buffer */
        t_buf[loop] = 0;
    }
    /* Global fence to sync before starting */
    rc = LAPI_Gfence(t_hndl);
    /* Process AM */
    rc = LAPI_Getcntr(t_hndl, &t_cntr, &val);
    while (val < 1) {
        sleep(1); /* Do some work */
          /* Poll the adapter once */
        rc = LAPI_Probe(t_hndl);
        rc = LAPI_Getcntr(t_hndl, &t_cntr, &val);
    }
    /* To reset the t_cntr value */
    rc = LAPI_Waitcntr(t_hndl, &t_cntr, 1, &cur_val);
    printf("Node %d, done doing work and "
        "processing AM\n", task_id);
    while (!cont) {
        sleep(1); /* Do some work */
    }
    rc = LAPI_Gfence(t_hndl);
    /* Process Get */
    rc = LAPI_Getcntr(t_hndl, &t_cntr, &val);
    while (val < 1) {
    sleep(1); /* Do some work */
      /* Poll the adapter once */
    rc = LAPI_Probe(t_hndl);
    rc = LAPI_Getcntr(t_hndl, &t_cntr, &val);
    }
    /* To reset the t_cntr value */
    rc = LAPI_Waitcntr(t_hndl, &t_cntr, 1, &cur_val);
    printf("Node %d, done doing work and "
        "processing Get\n", task_id);
}
    /* Global fence to sync before terminating job */
    rc = LAPI_Gfence(t_hndl);
    rc = LAPI_Term(t_hndl);
}
```

Following is a list of subroutines and their definitions usable with LAPI of the present invention. These subroutine definitions will be understood by those skilled in the art for use in the present implementation of LAPI.

Initialization and Termination

Initialize LAPI

LAPI_Init, LAPI_INIT Function

Purpose

Initialize the LAPI subsystem.

C Syntax include <lapi.h> int LAPI_Init(hndl, lapi_info)

lapi_handle_t *hndl;

lapi_info_t *lapi_info;

Parameters

| | | |
|---|---|---|
| hndl | - OUT | A handle that specifies a particular LAPI context. This parameter can not be NULL. |
| lapi_info | - IN/OUT | A structure that provides the parallel job info that this LAPI context is associated with. This parameter can not be NULL. |

Description

This function instantiates a new context of LAPI subsystem and initializes it. A handle to the newly created LAPI context is returned in hndl. All subsequent LAPI calls can use hndl to specify the context of the LAPI operation. lapi_info structure (lapi_info_t) needs to be filled in:

```
typedefstruct {    /* Not in use currently */
    lapi_dev_t      protocol;       /* OUT - Which
                                    protocol is initialized */
    int             info2;          /* Future support */
    int             info3;          /* Future support */
    int             info4;          /* Future support */
    int             info5;          /* Future support */
    int             info6;          /* Future support */
    LAPI_err_hndlr  *err_hndlr;     /* IN - User
                                    registered error handler */
    void            *info_info2;    /* Future support */
    void            *info_info3;    /* Future support */
    void            *info_info4;    /* Future support */
} lapi_info_t;
lapi_dev_t is defined as follows:
typedef enum {NULL_DEV = 0, TB2_DEV, TB3_DEV, UDP_DEV,
    VIRTUAL_DEV, LAST_DEV} lapi_dev_t;
```

NOTE: Only TB3_DEV lapi_dev_t type is supported in this release. User can register an error handler through lapi info structure. The user needs to create a function with the following parameters:
void (User func name) (lapi_handle_t *hndl, /* LAPI handle */
int *error_code, /* Error code */
lapi_err_t *err_type, /* GET/PUT/RMW/AM/INTERNAL */
int *task_id, /* Current node */
int *src); /* Source node */

Error code (*error_code) of LAPI_ERR_TIMEOUT is a recoverable error if the user chooses to ignore it in the user's error handler. All other error codes are currently terminal and the user should do clean up processing of user's process and terminate the process (i.e. exit()).

Except for LAPI_Address() and LAPI_Msg_string(), it is an error to make any LAPI calls before calling LAPI_Init().

Return Values

LAPI_SUCCESS—on successful completion.

The following can be returned on error:

EBUSY—System error—Previous job still running.

EINVAL—System error—Invalid argument.

EPERM—System error—caller not authorized to perform the action.

ETIMEDOUT—System error—Switch network is not up.

ENODEV—System error—Adapter type and library do not match.

ENOSPC—System error—Can not attach to bus memory—out of memory or segment register.

CSS_KE_INTERNAL_ERROR—System error— Kernel extension internal memory management failed.

CSS_KE_UCODE_ERROR—System error—Adapter micro code is not responding.

LAPI_ERR_UNKNOWN_DEVICE—Not supported device.

LAPI_ERR_NOMORE_PORTS—No more communication ports are available.

LAPI_ERR_INIT_FAILED—Initialization failed.

LAPI_ERR_OPEN_FAILED—Opening of communication device failed.

LAPI_ERR_BAD_PARAMETER—Invalid parameter passed in.

Related Information

LAPI_Term.

Terminate the LAPI context

LAPI_Term, LAPI_TERM Function

Purpose

Terminate and cleanup the LAPI subsystem.

C Syntax include <lapi.h> int LAPI_Term(hndl) lapi_handle_t hndl;

Parameters hndl—IN The handle that specifies a particular LAPI context.

Description

This function terminates the LAPI context specified by hndl. Any LAPI notification threads associated with this context will be terminated. It is an error to make any LAPI calls using hndl after LAPI_Term() has been called, except for LAPI_Msg_string() and LAPI_Address().

Return Values

LAPI_SUCCESS—on successful completion.

The following can be returned on error:

EINVAL—System error—Invalid argument.

EPERM—System error—caller not authorized to perform the action.

LAPI_ERR_CLOSE_FAILED—Close of communication device failed.

LAPI_ERR_BAD_PARAMETER—Invalid parameter passed in.

Related Information

LAPI_Init.

Return Message String, Query and Set LAPI Environment Functions

Get LAPI message string.

LAPI_Msg_string, LAPI_MSG_STRING Function

Purpose

Get LAPI and System Message String.

C Syntax include <lapi.h>
LAPI Msg_string(error_code, buf) int error_code;
void * buf;

Parameters error_code—IN The return value of a previous LAPI call.
buf—OUT Buffer to store the message string.

Description

This function returns the message string representation of the return value for a specific LAPI call.

Return Values

LAPI_SUCCESS—on successful completion.

The following can be returned on error:

LAPI_ERR_BAD_PARAMETER—Invalid parameter passed in.

Related Information

LAPI_Init, LAPI_Term.

Query LAPI Environment

LAPI_Qenv, LAPI_QENV Function

Purpose

Query the LAPI interface for parallel job information.

C Syntax include <lapi.h>int LAPI_Qenv(hndl, query, ret_val) lapi_handle_t hndl;
 lapi_query_t query;
 int *ret_val;

Parameters

| hndl | - IN | The handle that specifies a particular LAPI context. |
| query | - IN | Type of query requested as defined by lapi_query_t in lapi.h. |
| ret_val | - OUT | The integer value of the query request. This parameter can not be NULL. |

Description

This function queries the LAPI interface for information about a specific LAPI instance. lapi_query_t defines the types of LAPI queries available.

| typedef enum | {TASK_ID = 0, | /* Query task id of current task in job */ |
| | NUM_TASKS, | /* Query number of tasks in job */ |
| | MAX_UHDR_SZ, | /* Query max. user header size for AM */ |
| | MAX_DATA_SZ, | /* Query max. data length that can be sent */ |
| | ERROR_CHK, | /* Query & Set parameter checking on(1)/off(0) */ |
| | TIMEOUT, | /* Query & Set current comm. timeout setting */ |
| | MIN_TIMEOUT, | /* Query minimum comm. timeout setting */ |
| | MAX_TIMEOUT, | /* Query maximum comm. timeout setting */ |
| | INTERRUPT_SET, | /* Query & Set interrupt on(1)/off(0) */ |
| | MAX_PORTS, | /* Query max. available comm. ports */ |
| | MAX_PKT_SZ, | /* This is the payload size of 1 packet */ |
| | NUM_REX_BUFS, | /* Number of retransmission buffers */ |
| | REX_BUF_SZ, | /* Size of Each retransmission buffer in bytes */ |
| | LAST_QUERY} | lapi_query_t; |

Return Values

LAPI_SUCCESS—on successful completion.

The following can be returned on error:

LAPI_ERR_BAD_PARAMETER—Invalid parameter passed in.

Related Information

LAPI_Amsend, LAPI_Get, LAPI_Put, LAPI_Senv.

Set LAPI Environment

LAPI_Senv, LAPI_SENV Function

Purpose

Set the LAPI environment for given context.

C Syntax include <lapi.h> int LAPI_Senv(hndl, query, set_val) lapi_handle_t hndl;
 lapi_query_t query;
 int set_val;

Parameters

| hndl | - IN | The handle that specifies a particular LAPI context. |
| set_lapi_env | - IN | LAPI set environment type as defined by lapi_query_t in lapi.h. |
| set_val | - IN | The integer value to set the LAPI environment. |

Description

This function sets the LAPI environment for specific LAPI instance. lapi_query_t defines the types of LAPI set environment variables.

| typedef enum | { . . . |
| | ERROR_CHK, | /* Query & Set parameter checking on(1)/off(0) */ |
| | TIMEOUT, | /* Query & Set current comm. timeout setting */ |
| | INTERRUPT_SET, | /* Query & Set interrupt on(1)/off(0) */ |
| | . . . } lapi_query_t; |

NOTE: If ERROR_CHK is set to 0 then for all LAPI calls parameter error checking are ignored (i.e. LAPI_ERR_BAD_PARAMETER is not returned).

Return Values

LAPI_SUCCESS—on successful completion.

The following can be returned on error:

LAPI_ERR_BAD_PARAMETER—Invalid parameter passed in.

Related Information

LAPI_Qenv.

Basic Data Transfer Calls

Direct Put

LAPI_Put, LAPI_PUT Function

Purpose

Put data into target address on a target process.

C Syntax

```
include <lapi.h>
int LAPI_Put(hndl, tgt, len, tgt_addr, org_addr,
        tgt_cntr, org_cntr, cmpl_cntr)
lapi_handle_t   hndl;
uint            tgt;
uint            len;
void            *tgt_addr;
void            *org_addr;
lapi_cntr_t     *tgt_cntr;
lapi_cntr_t     *org_cntr;
lapi_cntr_t     *cmpl_cntr;
```

Parameters

| | | |
|---|---|---|
| hndl | - IN | The handle specifying the LAPI context. |
| tgt | - IN | The target task number. This parameter is valid from 0 =< tgt < LAPI_Qenv(,NUM_TASKS,) -1. |
| len | - IN | The number of bytes to be transferred. This parameter is valid from 0 =< len < LAPI_Qenv (,MAX_DATA_SZ,). |
| tgt_addr | - IN | The address on target process where data is to be copied into. This parameter can be NULL only if len = 0. |
| org_addr | - IN | The address on the origin process where data is to be copied from. This parameter can be NULL only if len = 0. |
| tgt_cntr | - IN | The address of target counter. The target counter will be incremented after data has arrived at the target. If the parameter is NULL, this counter will not be updated. |
| org_cntr | - IN/OUT | The address of origin counter. The origin counter will be incremented after data is copied out of origin address. If the parameter is NULL, this counter will not be updated. |
| cmpl_cntr | - IN/OUT | The address of completion counter that is reflection of the tgt_cntr. This counter will be incremented at the origin after tgt_cntr is incremented. If the parameter is NULL, counter will not be updated. |

Description

This function transfers len number of bytes from virtual address org_addr on the origin to the target process tgt at the address tgt_addr over the port identified by hndl. After the data has been copied out of the memory at org_addr the org_cntr is incremented. After the data has arrived at the tgt, the tgt_cntr is incremented. If either counter address is NULL, the data transfer happens, but the corresponding counter increment do not take place. This is a non blocking call, in that, the calling program may not assume that origin buffer may be changed, nor that contents of the memory pointed to by tgt_addr on tgt is ready for use. However, after the origin waits for the org_cntr update to complete, the origin can modify the origin buffer org_addr. Similarly, the target can modify the data in the target buffer tgt_addr after it has waited for tgt_cntr update to complete on the target. This call can be made synchronous if the origin waits for the cmpl_cntr update to complete.

Return Values

LAPI_SUCCESS—on successful completion.

The following can be returned on error:

LAPI_ERR_BAD_PARAMETER—Invalid parameter passed in.

Related Information

LAPI_Fence, LAPI_Get, LAPI_Getcntr, LAPI_Gfence, LAPI_Qenv, LAPI_Waitcntr.

Direct Get

LAPI_Get, LAPI_GET Function

Purpose

Copy data from a remote process to the local address on local process.

C Syntax

```
include <lapi.h>
int LAPI_Get(hndl, tgt, len, tgt_addr, org_addr,
        tgt_cntr, org_cntr)
lapi_handle_t   hndl;
uint            tgt;
uint            len;
void            *tgt_addr;
void            *org_addr;
lapi_cntr_t     *tgt_cntr;
lapi_cntr_t     *org_cntr;
```

Parameters

| | | |
|---|---|---|
| hndl | - IN | The handle specifying the LAPI context. |
| tgt | - IN | Target task which is the source of the data. This parameter is valid from 0 =< tgt < LAPI_Qenv(,NUM_TASKS,) -1. |
| len | - IN | The number of bytes of data to be copied. This parameter is valid from 0 =< len < LAPI_Qenv (,MAX_DATA_SZ,). |
| tgt_addr | - IN | Target buffer address of the data source. This parameter can be NULL only if len = 0. |
| org_addr | - IN/OUT | Local buffer address that the received data is copied into. This parameter can be NULL only if len = 0. |
| tgt_cntr | - IN | The address of target counter. The target counter will be incremented after data has been copied out of the target buffer. If the parameter is NULL, this counter will not be updated. |
| org_cntr | - IN/OUT | The address of origin counter. |

The origin counter will be incremented after data has arrived at the origin. If the parameter is NULL, this counter will not be updated.

Description

Use this subroutine to transfers len number of bytes from tgt_addr address at the target process to the org_addr virtual address at the origin process over the port identified by hndl. After the data is copied out of the memory at tgt_addr, the tgt_cntr is incremented. After the data arrives at the origin, the org_cntr is incremented. If either counter address is NULL, the data transfer occurs, but the corresponding counter increment does not take place. This is a non blocking call in that the calling program (all processes associated with the program including the local and remote processes involved) can not assume that the target buffer can be changed, nor that contents of the memory pointed to by org_addr on the origin is ready for use. However, after the origin waits for the org cntr update to complete, the origin can use the org_addr data. Similarly, the target can reuse the target buffer tgt_addr only after it has waited for the tgt_cntr update to complete at the target.

Return Values
  LAPI_SUCCESS—on successful completion.
  The following can be returned on error:
  LAPI_ERR_BAD_PARAMETER—Invalid parameter passed in.
Related Information
  None.
Related Information
  LAPI_Fence, LAPI_Getcntr, LAPI_Gfence, LAPI_Put, LAPI_Qenv, LAPI_Waitcntr.

Get, Wait, Set and Probe Operations

Get Counter Operation
  LAPI_Getcntr, LAPI_GETCNTR Function

Purpose

Gets the integer value of counter.
C Syntax

```
include <lapi.h>
int LAPI_Getcntr(hndl, cntr, val)
lapi_handle_t   hndl;
lapi_cntr_t     *cntr;
int             *val;
Parameters
```

| | | |
|---|---|---|
| hndl | - IN | The handle specifying the LAPI context. |
| cntr | - IN | Address of the counter. This parameter can not be NULL. |
| val | - OUT | Stores the integer value of counter. This parameter can not be NULL. |

Description

Gets the integer value of cntr. This can be used to see how much progress is being made in LAPI context hndl. In conjunction, LAPI_Probe() can be used to make progress in LAPI context hndl if LAPI_Getcntr() is called inside a loop.

Return Values
  LAPI_SUCCESS—on successful completion.
  The following can be returned on error:
  LAPI_ERR_BAD_PARAMETER—Invalid parameter passed in.
Related Information
  LAPI_Amsend, LAPI_Get, LAPI_Probe, LAPI_Put, LAPI_Setcntr, LAPI_Waitcntr.

Wait Counter Operation

LAPI_Waitcntr, LAPI_WAITCNTR Function

Purpose

Waits till a specified counter reaches the value specified.

-continued

C Syntax

```
include <lapi.h>
int LAPI_Waitcntr(hndl, cntr, val, cur_cntr_val)
lapi_handle_t   hndl;
lapi_cntr_t     *cntr;
int             val;
int             *cur_cntr_val;
Parameters
```

| | | |
|---|---|---|
| hndl | - IN | The handle specifying the LAPI context. |
| cntr | - IN | The address of the counter to be waited on. This parameter can not be NULL. |
| val | - IN | The value the counter needs to reach. |
| cur_cntr_val | - OUT | The integer value of current counter. This parameter can be NULL. |

Description

This function waits till the cntr reaches or exceeds the specified val. Once the cntr reaches the val, the cntr is decremented by that value. (we say decremented rather than set to zero since the cntr could has had a value greater than the specified val, when the call was made). This call may or may not check for message arrivals over the LAPI context hndl; LAPI_Probe will always check for message arrivals.

Return Values
  LAPI_SUCCESS—on successful completion.
  The following can be returned on error:
  LAPI_ERR_BAD_PARAMETER—Invalid parameter passed in.
Related Information
  LAPI_Amsend, LAPI_Get, LAPI_Getcntr, LAPI_Probe, LAPI_Put, LAPI_Rmw, LAPI_Setcntr.

Set Counter Operation

LAPI_Setcntr, LAPI_SETCNTR Function
Purpose
  Sets a counter to a specified value.

C Syntax

```
include <lapi.h>
int LAPI_Setcntr(hndl, cntr, val)
lapi_handle_t   hndl;
lapi_cntr_t     *cntr;
int             val;
Parameters
```

| | | |
|---|---|---|
| hndl | - IN | The handle specifying the LAPI context. |
| cntr | - IN/OUT | The address of the counter to be set. This parameter can not be NULL. |
| val | - IN | The value the counter needs to be set to. |

Description

This function sets the cntr to the appropriate value. The LAPI context associated with hndl may or may not be polled for incoming messages.

Return Values
  LAPI_SUCCESS—on successful completion.
  The following can be returned on error:
  LAPI_ERR_BAD_PARAMETER—Invalid parameter passed in.

Related Information
   LAPI_Getcntr, LAPI_Probe, LAPI_Waitcntr.

LAPI Probe

LAPI_Probe, LAPI_PROBE Function

Purpose

To transfer control to the communications subsystem to check for arriving messages and to make progress in polling mode.

C Syntax
   #include <lapi.h>int LAPI_Probe(hndl) lapi_handle_t hndl;

Parameters
   hndl—IN The handle specifying the LAPI context.

Description

This function transfers control to the communications subsystem in order to make progress on messages associated with the context hndl. Note that no guarantees are made about receipt of messages on the return from this function.

Return Values
   LAPI_SUCCESS—on successful completion.
   The following can be returned on error:
   LAPI_ERR_BAD_PARAMETER—Invalid parameter passed in.

Related Information
   LAPI_Getcntr, LAPI_Waitcntr, LAPI_Setcntr.

Read-Modify-Write Operations

LAPI_Rmw, LAPI_RMW Function

Purpose
   This function provides the synchronization primitives.

C Syntax

```
include <lapi.h>
int LAPI_Rmw(hndl, op, tgt, tgt_var, in_val,
             prev_tgt_val, org_cntr)
lapi_handle_t  hndl;
RMW_ops_t      op;
uint           tgt;
int            *tgt_var;
int            *in_val;
int            *prev_tgt_val;
lapi_cntr_t    *org_cntr;
```

Parameters

| | | |
|---|---|---|
| hndl | - IN | The handle specifying the LAPI context. |
| op | - IN | The operation to be performed. |
| tgt | - IN | The target task on which the RMW variable resides. This parameter is valid from 0 =< tgt < LAPI_Qenv(,NUM_TASKS,). |
| tgt_var | - IN | The target RMW variable address. This parameter can not be NULL. |
| in_val | - IN | The value input to the op. This parameter can not be NULL. |
| prev_tgt_val | - IN/OUT | The location at the origin in which previous tgt_var on the target process is stored before the RMW op is executed. This parameter can be NULL. |
| org_cntr | - IN/OUT | The address of origin counter. The origin counter will be incremented after data is copied out of origin address. If the parameter is NULL, this counter will not be updated. |

Description

The LAPI_Rmw function is used to synchronize two independent operations such as two processes sharing a common data structure. The operation is performed at the tgt target process and is atomic. The operation takes a in_val from the origin and performs one of four selected op operations on a tgt_var variable at the tgt target and replaces the tgt_var target variable with the results of the op operation. The prev_tgt_val original value of the tgt_var target variable is returned to the origin.

The valid operations for op are:
   FETCH_AND_ADD
   FETCH_AND_OR
   SWAP
   COMPARE_AND_SWAP.

The operations are performed over the context referred to by hndl. The outcome of the execution of these calls is as if the following code was executed atomically.
   *prev_tgt_val=*tgt_var;
   *tgt_var=f(*tgt_var, *in_val);
where
   f(a; b)=a+b for FETCH_AND_ADD,
   f(a; b)=a|b for FETCH_AND_OR (bitwise or), and
   f(a; b)=b for SWAP.

For COMPARE_AND_SWAP in_val is treated as a pointer to an array of two integers, and the op is the following atomic operation.

```
if(*tgt_var == in_val[0]) {
    *prev_tgt_val = TRUE;
    *tgt_var = in_val[1];
} else {
    *prev_tgt_val = FALSE;
}
```

All the calls are nonblocking. Testing for completion is by using LAPI_Getcntr and LAPI_Waitcntr functions described above. There is no tgt_cntr on RMW calls, and they do not provide any indication of completion on the tgt process.

Return Values
   LAPI_SUCCESS—on successful completion.
   The following can be returned on error:
   LAPI ERR BAD PARAMETER—Invalid parameter passed in.

Related Information
   LAPI_Getcntr, LAPI_Probe, LAPI_Qenv, LAPI_Setcntr, LAPI_Waitcntr.

Fence Calls

Local fence

LAPI_Fence, LAPI_FENCE Function

Purpose
   This function is used to enforce order on LAPI calls.

C Syntax

```
include <lapi.h>
int LAPI_Fence(hndl)
lapi_handle_t hndl;
```

Parameters

| | | |
|---|---|---|
| hndl | - IN | The handle specifying the LAPI context. |

Description

If a process calls LAPI_Fence(), all the LAPI operations that were initiated by that process before the fence using the LAPI context hndl are guaranteed to complete at the target processes before any of its communication operations using hndl initiated after the fence complete at the target processes. This is a data fence which means that the data movement is complete. This is not an operation fence which would need to include Active Message completion handlers completing on the target.

Return Values

LAPI_SUCCESS—on successful completion.
The following can be returned on error:
LAPI_ERR_BAD_PARAMETER—Invalid parameter passed in.

Related Information

LAPI_Amsend, LAPI_Get, LAPI_Gfence, LAPI_Put, LAPI_Rmw.

Global Fence

LAPI_Gfence, LAPI_GFENCE Function

Purpose

This function is used to enforce order on LAPI calls on all processes.

C Syntax include <lapi.h>int LAPI_Gfence(hndl) lapi_handle_t hndl;

Parameters hndl—IN The handle specifying the LAPI context.

Description

This is a collective call. On completion of this call, it is assumed that all LAPI communication associated with hndl from all processes has quiesced. Note that although hndl is a local variable, it has a set of nodes that were associated with it at LAPI_Init all of which have to participate in this operation for it to complete. This is a data fence which means that the data movement is complete. This is not an operation fence which would need to include Active Message completion handlers completing on the target.

Return Values

LAPI_SUCCESS—on successful completion.
The following can be returned on error:
LAPI_ERR_BAD_PARAMETER—Invalid parameter passed in.

Related Information

LAPI_Fence.

Exchanging Virtual Addresses

All LAPI data transfer calls are required to provide virtual addresses on the target processes. How does a process know the virtual addresses of objects on other processes?

- In the case of SPMD programs it may be possible to assume that all processes have the same virtual address map. In such cases, one may assume that the local virtual address of a static object (global variables in C or fortran common blocks) is the same as the virtual address of the same object on a different process. This assumption is Operating System dependent, and is true under the current versions of AIX. However, AIX has the ability to relocate static data objects when an executable file is loaded and, this assumption may not be valid on future versions of AIX.
- Get and Put can be used to move addresses, but in order to do so, there needs to be a mechanism provided for boot-strapping. If all processes could agree on a specific virtual address where they place an array of pointers to objects of interest, then a process could simply get the appropriate address from this table by indexing with respect to the address of the array of pointers. This approach may not work in non-SPMD programs, where it may not be possible to agree on such a specific address.

To solve this problem, the following function in LAPI is defined, which is a collective communication operation, that basically collects one address from each process and distributes all the addresses to all the processes.

LAPI_Address_init, LAPI_ADDRESS_INIT Function

Purpose

To exchange virtual addresses for non SPMD programs and for dynamically allocated data.

C Syntax include <lapi.h>
int LAPI_Address_init(hndl, my_addr, add_tab)
lapi_handle_t hndl;
void           *my_addr;
void           *add_tab[];

Parameters

| hndl | - IN | The handle specifying the LAPI context. |
|---|---|---|
| my_addr | - IN | The entry supplied by each process. This parameter can be NULL. |
| add_tab | - IN/OUT | The address table containing the addresses supplied by all processes This parameter can not be NULL. |

Description

This function is used to exchange virtual an d dynamically allocated addresses. add_tab is an array of pointers of size LAPI_Qenv(,NUM_TASKS,). This function is a collective call over the LAPI context hndl which fills the table add_tab with the entries supplied by each task. Upon completion of this call, add _tab[i] will contain the entry provided by task i.

Return Values

LAPI_SUCCESS—on successful completion.
The following can be returned on error:
LAPI_ERR_BAD_PARAMETER—Invalid parameter passed in.

Related Information

None.

Generic Active Message Functions

The LAPI library provides a generic Active Message function as a means to allow users to extend the base set of LAPI functions. The Active Message function simply provides a means to call a user written handler.

LAPI Active Message

LAPI_Amsend, LAPI_AMSEND Function

Purpose

To invoke a user provided Active Message (AM) handler to run on a remote (target) process.

C Syntax include <lapi.h>
typedef void (compl_hndlr_t)(hndl, user_info);
lapi_handle_t  hndl;        LAPI context passed in
                            from LAPI_Amsend.

-continued

```
void            *user info;   Buffer (user_info) pointer passed
                              in from header handler
                              (void * (hnd_hndlr_t)).
typedef void * (hdr_hndlr_t)(hndl, uhdr, uhdr_len,
               msg_len, comp_h, user_info);
lapi_handle_t   hndl;         LAPI context passed in
                              from LAPI_Amsend.
void *          uhdr;         uhdr passed in from
                              LAPI_Amsend.
uint            uhdr_len;     uhdr_len passed in from
                              LAPI_Amsend.
uint *          msg_len;      udata_len passed in from
                              LAPI_Amsend.
compl_hndlr_t   **comp_h;     Function address of
                              completion handler
                              (void (compl_hndlr_t)) that
                              needs to be filled out by
                              this header handler function.
void            **user_info;  Buffer pointer (user_infdo)
                              that is provided by this
                              header handler function to
                              pass to the completion
                              handler
int LAPI_Amsend(hndl, tgt, hdr_hdl, uhdr, uhdr_len,
       udata, udata_len, tgt_cntr,
       org_cntr, cmpl_cntr)
lapi_handle_t   hndl;
uint            tgt;
void            *hdr_hdl;
void            *uhdr;
uint            uhdr_len;
void            *udata;
uint            udata_len;
lapi_cntr_t     *tgt_cntr;
lapi_cntr_t     *org_cntr;
lapi_cntr_t     *cmpl_cntr;
Parameters hndl            - IN          The handle specifying the
                              LAPI context.
tgt             - IN          The target task number.
                              This parameter is valid from
                              0 =< tgt < LAPI_Qenv(,NUM_TASKS,)
hdr_hdl         - IN          The pointer to the remote header
                              handler function to be invoked at
                              the target. This parameter can
                              not be NULL.
uhdr            - IN          The pointer to the local header
                              (parameter list) which is passed
                              to the handler function. This
                              parameter can be NULL if
                              uhdr_len = 0.
uhdr_len        - IN          This parameter is valid from
                              0 =< uhdr_len < LAPI_Qenv(,
                              MAX_UHDR_SZ,).
udata           - IN          Pointer to the user data.
                              This parameter can be NULL if
                              udata_len = 0.
udata_len       - IN          Length of the user data in bytes.
                              This parameter is valid from
                              0 =< udata_len < LAPI_Qenv(,
                              MAX_DATA_SZ,).
tgt_cntr        - IN          The address of target counter.
                              The target counter will be
                              incremented after data has
                              arrived at the target and after
                              the completion handler completes.
                              If the parameter is NULL, this
                              counter will not be updated.
org_cntr        - IN/OUT      The address of origin counter.
                              The origin counter will be
                              incremented after data is copied
                              out of origin address.
                              If the parameter is NULL, this
                              counter will not be updated.
cmpl_cntr       - IN/OUT      The counter at the origin that
                              signifies completion of
                              completion handler. It will be
                              updated once completion handler
                              completes. If the parameter is
                              NULL, counter will not be updated.
```

Description

This function transfers hdr_hdl function pointer along with .the contents of uhdr and udata from the origin to the target process tgt. When the message arrives at the target process, the header-handler hdr_hdl is invoked at the tgt target with the pointer to uhdr as one of the parameters. The user-supplied header-handler is expected to return a buffer pointer (user_info) as the return value, in which udata is to be copied. The header-handler is also expected to save any information that will be required later by the completion-handler. The header-handler returns (through reference parameters) the completion-handler and a pointer to the saved information (user_info). Note: that the header-handler should be non-blocking because no progress on the messages associated with hndl can be made until control is returned to the communications library from the header-handler. After the header-handler returns, udata (if any) is copied into the user-specified buffer (user_info). When all of the udata has been copied into the user buffer, the completion-handler specified by the user through the header-handler is enqueued. After the parameters (including contents of uhdr and udata) are copied out of the memory at the origin, the org_cntr is incremented. After the completion-handler has completed execution at the tgt, the tgt_cntr is incremented. If the completion handler specified is a NULL, then tgt_cntr is incremented after all of udata has been copied into the user specified buffers. If the user specified buffer is NULL and the completion handler is also NULL, then tgt_cntr will be incremented in some implementation specific manner. Either counter addresses may be NULL. This is a non blocking call.

The calling process cannot change the uhdr origin header and udata data until completion at the origin is signaled by the org_cntr being incremented. Similarly, it can be assumed that the specified AM handler has run at tgt only after the target counter tgt_cntr has been incremented. The cmpl_cntr and tgt_cntr counters will be incremented after the AM handler has completed execution at the target. When the AM handler has both a hdr_hdl header handler and comp_h completion handler, the cmpl_cntr and tgt_cntr counters will be incremented after the completion handler has completed execution.

If the AM handler has only a hdr_hdl header handler, the cmpl_cntr and tgt_cntr counters will be incremented after the header handler has completed execution. This call can be made synchronous if the origin waits for the cmpl_cntr update to complete. The length (uhdr_len) of the user specified header is constrained by an implementation specified maximum value (LAPI_Qenv(,MAX_UHDR_SZ,)). In the current implementation, the amount of udata sent per packet is LAPI_Qenv(,MAX_UHDR_SZ,)—uhdr_len. To get the best bandwidth uhdr_len should be as small as possible.

Return Values

LAPI_SUCCESS—on successful completion.

The following can be returned on error:

LAPI_ERR_BAD_PARAMETER—Invalid parameter passed in.

Related Information

LAPI_Fence, LAPI_Getcntr, LAPI_Qenv, LAPI_Waitcntr.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A method for sending user messages from a sender to a receiver in a data processing system, said method comprising the steps of:
    a) sending a user message from the sender to the receiver;
    b) receiving the user message from the sender by the receiver, said user message having therein a pointer to a header handler, said header handler specifying a target buffer to be used and a completion routine;
    c) placing the received user message in said target buffer specified in said header handler; and
    d) completing the message transfer from said sender to said receiver in accordance with said completion routine specified in said header handler.

2. The method of claim 1 wherein step a) comprises placing said user message in a network buffer in said sender, step b) comprises transferring said user message from said network buffer in said sender into a network buffer in said receiver, and step c) comprises placing the user message in said target buffer from the network buffer in said receiver.

3. The method of claim 1 wherein step b) is invoked by polling said network buffer to ascertain if said user message is present at said receiver.

4. The method of claim 1 wherein step b) is invoked by providing an interrupt to said receiver indicating said sender has sent a user message to said receiver.

5. The method of claim 1 wherein said receiver has one or more completion routines and step d) further includes indicating the completion routine which is to complete the message transfer from said sender to said receiver.

6. The method of claim 5 wherein one of said completion routines is a null routine.

7. The method of claim 5 further comprising providing a means for increasing the number of completion routines at said receiver.

8. The method of claim 7 further comprising tailoring said completion routines to be compatible with said receiver.

9. The method of claim 8 wherein said data processing system includes multiple receivers, and said completion routines are tailored to individual ones of said receivers.

10. The method of claim 1 wherein consecutive user messages are sent from the sender to the receiver, said receiver has one or more target buffers, and step c) further comprises sending said message to a designated target buffer as determined by said header handler such that data in each user message may be placed in a respective target buffer independent of the order said consecutive user messages are received by said receiver.

11. The method of claim 10 wherein one of said target buffers is a null buffer.

12. The method of claim 10 wherein steps a) through c) of a new user message may be started before completion of step d) of a previously sent user message such that completion of transfers for consecutively sent user messages may be performed in parallel.

13. The method of claim 12 further comprising throttling the sending of further user messages from said sender to said receiver when there is not sufficient resources at the receiver to handle an additional consecutively sent user message.

14. The method of claim 13 wherein said lack of resources comprises lack of sufficient target buffer resources to contain an additional consecutively sent user message.

15. The method of claim 13 wherein step b) comprises placing user messages in a network buffer in said receiver, and said lack of resources comprises lack of sufficient space in said network buffer to contain an additional consecutively sent user message.

16. The method of claim 13 wherein said receiver comprises internal resources for completing the message transfer from said sender to said receiver, and said lack of resources comprises lack of internal resources to complete an additional consecutively sent user message.

17. The method of claim 11 further comprising fencing said sender such that further user messages can not be sent from said sender to said receiver until step c) is completed for each of the user messages previously sent.

18. The method of claim 1 further comprising the step of:
    e) sending an internal message from said receiver to said sender for indicating receipt of said user message.

19. The method of claim 18 wherein step e) further comprises giving priority to steps a) through c) over step e) such that the sending of the internal message is delayed until after step c) is completed.

20. The method of claim 18 further comprising incorporating said internal message with a user message being sent from said receiver to said sender when said receiver is acting as a sender of user messages and said sender is acting as a receiver of user messages.

21. The method of claim 18 wherein consecutive user messages are sent from said sender to said receiver and an internal message is sent from said receiver to said sender indicating receipt of a previous user message, said method further comprising inhibiting the sending of said internal message when a resource of the receiver is insufficient such that a further user message transfer cannot be completed, and sending said internal message when said receiver is again able to receive a user message.

22. The method of claim 18 wherein consecutive user messages are sent from said sender to said receiver and an internal message is sent from said receiver to said sender indicating receipt of a previous user message, said method further comprising raising an interrupt to said sender when an internal message has been sent from said receiver to said sender.

23. The method of claim 22 further comprising setting a threshold of internal messages that may be sent from said receiver to said sender before said interrupt is raised such that multiple internal messages may be sent to said sender to be handled in response to a single interrupt.

24. A method for sending consecutive user messages from a sender to a receiver in a data processing system, said method comprising the steps of:
    sending consecutive user messages from said sender to said receiver, each user message containing data to be processed by said receiver;
    processing the data from said messages by said receiver; and
    sending an acknowledgment from said receiver to said sender acknowledging the receipt of each user message, said user messages which have been started by said sender having priority over said acknowledgments such that said acknowledgements are delayed until after user messages which have been started are received by said receiver.

25. The method of claim 24 further comprising dividing the consecutive user messages to be sent into sets, and providing a fence between the sets such that a first set of user messages are sent from the sender to the receiver and the data therein is received by the receiver before a second set of user messages is sent.

26. The method of claim 24 further comprising throttling the sending of new user messages from the sender to the receiver if the data from previously sent user messages have not been received by the receiver.

27. The method of claim 26 wherein said throttling is provided by failing to send acknowledgments to said user messages by said receiver such that said sender will resend said user messages and not send new user messages.

28. The method of claim 24 wherein an interrupt is raised responsive to the sending of said acknowledgment for informing said sender that said acknowledgment has been sent.

29. The method of claim 28 further comprising sending a set number of acknowledgments before an interrupt is raised such that said set number of acknowledgments are handled in a single interrupt.

30. An apparatus for sending user messages from a sender to a receiver in a data processing system, said apparatus comprising:
   a message handler connected to the sender and receiver for transferring a user message from the sender to the receiver:
   a target buffer in said receiver for storing the received message; and
   a completion routine in said receiver for completing the message transfer from said sender to said receiver; and
   a header handler in said receiver, said header handler being pointed to by a pointer in said user message and, when invoked, indicating said user buffer and said completion routine; and
   a low level application programming interface (LAPI) in said receiver, said LAPI 1) invoking said header handler pointed to by said pointer such that said header handler returns a first pointer pointing to user buffer and a second pointer pointing to said completion routine, 2) storing said user message in said user buffer pointed to by said first pointer, and 3) invoking said completion routine pointed to by said second pointer thereby completing the transfer of said user message from said sender to said receiver.

31. The apparatus of claim 30 further comprising:
   a sender network buffer in said sender and a receiver network buffer in said receiver, said message handler transferring said user message from said sender network buffer into said receiver network buffer and said header handler moving said user message from said network buffer in the receiver to said target buffer.

32. The apparatus of claim 30 further comprising a polling mechanism in said receiver for polling the network buffer in the receiver ascertaining if a user message is present at said receiver.

33. The apparatus of claim 30 further comprising a interrupt mechanism in said receiver for providing an interrupt to said receiver for indicating said sender has sent a user message to said receiver.

34. The apparatus of claim 30 further comprising one or more completion routines in said receiver, said first pointer returned by said header handler pointing to the completion routine which is to complete the message transfer from said sender to said receiver.

35. The apparatus of claim 34 wherein one of said completion routines is a null routine.

36. The apparatus claim 35 further comprising a mechanism in said receiver for increasing the number of completion routines in said receiver.

37. The apparatus of claim 36 wherein said completion routines are tailored to be compatible with said receiver.

38. The apparatus of claim 37 wherein said data processing system includes multiple receivers, and said completion routines are tailored to individual ones of said receivers.

39. The apparatus of claim 30 wherein consecutive messages are sent from said sender to said receiver, said apparatus further comprising more than one target buffers in said receiver, said header handler routine in each message header sending each user message to a designated target buffer as determined by said header handler such that data in each user message may be placed in a respective target buffer independent of the order in which said consecutive messages are received by said receiver.

40. The apparatus of claim 39 wherein one of said target buffers is a null buffer.

41. The apparatus of claim 39 comprising a task dispatching mechanism in said receiver for dispatching said header handlers for said consecutively sent user messages wherein a new user message may be started before placing of previously sent user messages in their respective target buffers such that completion of transfers for consecutively sent user messages may be performed in parallel.

42. The apparatus of claim 41 further comprising a throttling mechanism for throttling the sending of further user messages from said sender to said receiver when there is not sufficient resources at the receiver to handle an additional consecutively sent user message.

43. The apparatus of claim 42 wherein said lack of resources comprises lack of sufficient target buffer resources to contain an additional consecutively sent user message.

44. The apparatus of claim 42 further comprising a network buffer in said receiver, and said message handler places user messages in said network buffer in said receiver, and said lack of resources comprises lack of sufficient space in said network buffer to contain an additional consecutively sent user message.

45. The apparatus of claim 42 wherein said receiver comprises internal resources for completing the message transfer from said sender to said receiver, and said lack of resources comprises lack of sufficient internal resources to complete an additional consecutively sent user message.

46. The apparatus of claim 41 further comprising a fencing mechanism for fencing said sender such that further user messages can not be sent from said sender to said receiver until after the storing previously sent user messages in their respective target buffers.

47. The apparatus of claim 30 further comprising:
   an internal message sending mechanism in said receiver for sending an internal message from said receiver to said sender for indicating receipt of said user message.

48. The apparatus of claim 47 further comprising a priority mechanism for giving priority to a user message being sent from said sender to said receiver and stored in said target buffer such that the sending of any internal message from said receiver to said sender is delayed until after said user message is stored in said target message.

49. The apparatus of claim 47 further comprising said receiver incorporating said internal message with a user message being sent from said receiver to said sender when said receiver is acting as a sender for sending user messages and said sender is acting as a receiver for receiving user messages.

50. The apparatus of claim 47 wherein consecutive user messages are sent from said sender to said receiver and an internal message is sent from said receiver to said sender indicating receipt of a previous message, said apparatus further comprising an inhibiting mechanism inhibiting the sending of said internal message when a resource of the receiver is insufficient such that a further user message transfer cannot be completed, said receiver sending said internal message when said receiver is again able to receive a user message.

51. The apparatus of claim 47 wherein consecutive user messages are sent from said sender to said receiver and an internal message is sent from said receiver to said sender indicating receipt of a previous message, said apparatus further comprising an interrupt apparatus raising an interrupt to said sender when an internal message has been sent from said receiver to said sender.

52. The apparatus of claim 51 further comprising a threshold setting a specified number of internal messages that may be sent from said receiver to said sender before said interrupt is raised such that multiple internal messages may be sent to said sender to be handled in response to a single interrupt.

53. An apparatus for sending consecutive user messages from a sender to a receiver in a data processing system, said apparatus comprising:
   a message sending mechanism sending consecutive user messages from said sender to said receiver, each user message containing data to be processed by said receiver;
   a data processor in said receiver processing the data from said user messages by said receiver; and
   an acknowledgment sending mechanism in said receiver sending an acknowledgment from said receiver to said sender acknowledging the receipt of each user message, said user messages which have been started by said sender having priority over said acknowledgments such that said acknowledgements are delayed until after user messages which have been started are received by said receiver.

54. The apparatus of claim 53 further comprising a fencing mechanism dividing the consecutive user messages to be sent into sets, said fencing mechanism providing a fence between the sets such that a first set of user messages are sent from the sender to the receiver and the data therein received by the receiver before a second set of user messages is sent.

55. The apparatus of claim 54 further comprising a throttling mechanism throttling the sending of new user messages from the sender to the receiver if the data in said previously sent user messages have not been received by the receiver.

56. The apparatus of claim 55 further comprising a retry mechanism in said sender which resends a user message to said receiver for any user message which is unacknowledged by said receiver, and wherein said throttling mechanism comprises failing to send an acknowledgment to user messages by said receiver such that said sender will resend unacknowledged user messages and not send new user messages.

57. The apparatus of claim 53 comprising an interrupt mechanism raising an interrupt responsive to the sending of said acknowledgment thereby informing said sender that said acknowledgment has been sent.

58. The apparatus of claim 57 further comprising a threshold mechanism sending a set number of acknowledgments before an interrupt is raised such that said set number of acknowledgments are handled in a single interrupt.

59. A program product recorded on a computer readable media, said program product including a method for sending user messages from a sender to a receiver in a data processing system, said method comprising the steps of:
   a) sending a user message from the sender to the receiver;
   b) receiving the user message from the sender by the receiver, said user message having therein a pointer to a header handler, said header handler specifying a target buffer to be used and a completion routine;
   c) placing the received user message in said target buffer specified in said header handler; and
   d) completing the message transfer from said sender to said receiver in accordance with said completion routine specified in said header handler.

60. The program product of claim 59 wherein step a) comprises placing said user message in a network buffer in said sender, step b) comprises transferring said user message from said network buffer in said sender into a network buffer in said receiver, and step c) comprises placing the user message in said target buffer from the network buffer in said receiver.

61. The program product of claim 59 wherein step b) is invoked by polling said network buffer to ascertain if said user message is present at said receiver.

62. The program product of claim 59 wherein step b) is invoked by providing an interrupt to said receiver indicating said sender has sent a user message to said receiver.

63. The program product of claim 59 wherein said receiver has one or more completion routines and step d) further includes indicating the completion routine which is to complete the message transfer from said sender to said receiver.

64. The program product of claim 63 wherein one of said completion routines is a null routine.

65. The program product of claim 63 further comprising providing a means for increasing the number of completion routines at said receiver.

66. The program product of claim 65 further comprising tailoring said completion routines to be compatible with said receiver.

67. The program product of claim 66 wherein said data processing system includes multiple receivers, and said completion routines are tailored to individual ones of said receivers.

68. The program product of claim 59 wherein consecutive user messages are sent from the sender to the receiver, said receiver has one or more target buffers, and step c) further comprises sending said message to a designated target buffer as determined by said header handler such that data in each user message may be placed in a respective target buffer independent of the order said consecutive user messages are received by said receiver.

69. The program product of claim 68 wherein one of said target buffers is a null buffer.

70. The product of claim 68 wherein steps a) through c) of a new user message may be started before completion of step d) of a previously sent user message such that completion of transfers for consecutively sent user messages may be performed in parallel.

71. The program product of claim 70 further comprising throttling the sending of further user messages from said sender to said receiver when there is not sufficient resources at the receiver to handle an additional consecutively sent user message.

72. The program product of claim 71 wherein said lack of resources comprises lack of sufficient target buffer resources to contain an additional consecutively sent user message.

73. The program product of claim 71 wherein step b) comprises placing user messages in a network buffer in said receiver, and said lack of resources comprises lack of sufficient space in said network buffer to contain an additional consecutively sent user message.

74. The program product of claim 71 wherein said receiver comprises internal resources for completing the message transfer from said sender to said receiver, and said lack of resources comprises lack of internal resources to complete an additional consecutively sent user message.

75. The program product of claim 69 further comprising fencing said sender such that further user messages can not be sent from said sender to said receiver until step c) is completed for each of the user messages previously sent.

76. The program product of claim 59 further comprising the step of:

e) sending an internal message from said receiver to said sender for indicating receipt of said user message.

77. The program product of claim 76 wherein step e) further comprises giving priority to steps a) through c) over step e) such that the sending of the internal message is delayed until after step c) is completed.

78. The program product of claim 76 further comprising incorporating said internal message with a user message being sent from said receiver to said sender when said receiver is acting as a sender of user messages and said sender is acting as a receiver of user messages.

79. The program product of claim 76 wherein consecutive user messages are sent from said sender to said receiver and an internal message is sent from said receiver to said sender indicating receipt of a previous user message, said method further comprising inhibiting the sending of said internal message when a resource of the receiver is insufficient such that a further user message transfer cannot be completed, and sending said internal message when said receiver is again able to receive a user message.

80. The program product of claim 76 wherein consecutive user messages are sent from said sender to said receiver and an internal message is sent from said receiver to said sender indicating receipt of a previous user message, said method further comprising raising an interrupt to said sender when an internal message has been sent from said receiver to said sender.

81. The program product of claim 80 further comprising setting a threshold of internal messages that may be sent from said receiver to said sender before said interrupt is raised such that multiple internal messages may be sent to said sender to be handled in response to a single interrupt.

82. A program product recorded on a computer readable media, said program product including a method for sending consecutive user messages from a sender to a receiver in a data processing system, said method comprising the steps of:

sending consecutive user messages from said sender to said receiver, each user message containing data to be processed by said receiver;

processing the data from said messages by said receiver; and sending an acknowledgment from said receiver to said sender acknowledging the receipt of each user message, said user messages which have been started by said sender having priority over said acknowledgments such that said acknowledgements are delayed until after user messages which have been started are received by said receiver.

83. The program product of claim 82 further comprising dividing the consecutive user messages to be sent into sets, and providing a fence between the sets such that a first set of user messages are sent from the sender to the receiver and the data therein is received by the receiver before a second set of user messages is sent.

84. The program product of claim 82 further comprising throttling the sending of new user messages from the sender to the receiver if the data from previously sent user messages have not been received by the receiver.

85. The program product of claim 84 wherein said throttling is provided by failing to send acknowledgments to said user messages by said receiver such that said sender will resend said user messages and not send new user messages.

86. The program product of claim 82 wherein an interrupt is raised responsive to the sending of said acknowledgment for informing said sender that said acknowledgment has been sent.

87. The program product of claim 86 further comprising sending a set number of acknowledgments before an interrupt is raised such that said set number of acknowledgments are handled in a single interrupt.

\* \* \* \* \*